(12) United States Patent
Butt et al.

(10) Patent No.: US 12,425,092 B2
(45) Date of Patent: Sep. 23, 2025

(54) METHOD AND SYSTEM FOR BEAM FAILURE MANAGEMENT

(71) Applicant: NOKIA TECHNOLOGIES OY, Espoo (FI)

(72) Inventors: Muhammad Majid Butt, Palaiseau (FR); Veronique Capdevielle, Magny les Hameaux (FR); Anil Rao, Redmond, WA (US); Afef Feki, Sceaux (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 437 days.

(21) Appl. No.: 17/916,658

(22) PCT Filed: Apr. 1, 2020

(86) PCT No.: PCT/EP2020/059303
§ 371 (c)(1),
(2) Date: Oct. 3, 2022

(87) PCT Pub. No.: WO2021/197601
PCT Pub. Date: Oct. 7, 2021

(65) Prior Publication Data
US 2023/0171836 A1    Jun. 1, 2023

(51) Int. Cl.
*H04W 76/19*    (2018.01)
*H04W 64/00*    (2009.01)

(52) U.S. Cl.
CPC ........... *H04W 76/19* (2018.02); *H04W 64/00* (2013.01)

(58) Field of Classification Search
CPC ...... H04W 76/19; H04W 64/00; H04B 7/088; H04B 7/0695
See application file for complete search history.

(56) References Cited

U.S. PATENT DOCUMENTS

2018/0091262 A1*    3/2018    Jung .................... H04L 1/1893

FOREIGN PATENT DOCUMENTS

| CN | 109 699 037 A | 4/2019 |
| CN | 110351880 A | 10/2019 |

(Continued)

OTHER PUBLICATIONS

International Search Report and Written Opinion dated Jan. 14, 2021 corresponding to International Patent Application No. PCT/EP2020/059303.

(Continued)

*Primary Examiner* — Ayanah S George
(74) *Attorney, Agent, or Firm* — SQUIRE PATTON BOGGS (US) LLP

(57) ABSTRACT

A method and apparatus (100) for beam failure management for a user equipment (UE) (104) are described. A beam failure instance counter (BFI_counter) is determined, that is indicative of a number of consecutive beam failure instances occurred at the UE (104), at a time instance. A location of the UE (104) is determined at the time instance. A beam failure probability factor is determined, based at least on the location of the UE (104) at the time instance and the BFI_counter. The beam failure probability factor is indicative of a probability of occurrence of a beam failure at the location of the UE (104), after a plurality of further time instances. Further, the beam failure probability factor is compared with a beam failure threshold probability (beamFailureThresholdProb). Thereafter, a beam failure is declared if the beam failure probability factor is higher than the beamFailureThresholdProb.

19 Claims, 15 Drawing Sheets

(56) References Cited

FOREIGN PATENT DOCUMENTS

| WO | 2019/238007 A1 | 12/2019 | | |
|---|---|---|---|---|
| WO | WO-2020005121 A1 * | 1/2020 | ........... | H04B 7/0695 |
| WO | 2020/033406 A1 | 2/2020 | | |
| WO | WO-2020033406 A2 * | 2/2020 | ........... | H04B 7/0695 |

OTHER PUBLICATIONS

K. Satyanarayana et al., "Deep Learning Aided Fingerprint-Based Beam Alignment for mmWave Vehicular Communication," IEEE Transactions on Vehicular Technology, vol. 68, No. 11, Nov. 1, 2019, pp. 10858-10871, XP011754953.

Communication pursuant to Article 94(3) EPC dated Mar. 4, 2025 corresponding to European Patent Application No. 20717145.5.

Notification of First Office Action dated Feb. 19, 2025 corresponding to Chinese Patent Application No. 202080099516X, with English translation thereof.

Gao Cheng et al., "Design and implementation of beam failure recovery in 5G," 5G Communication, Application of Electronic Technique, 2018, 44(9) : 9-11, 16.

\* cited by examiner

METHOD AND SYSTEM FOR BEAM FAILURE MANAGEMENT

TECHNICAL FIELD

Various example embodiments relate to a method and a system for beam failure management.

BACKGROUND

In 5G networks, downlink transmissions to different terminal devices located in different directions relative to a network device are separated in time for effective communication. For this purpose, beam management is used in the 5G network, to establish and retain a suitable beam pair, i.e. a transmitter-side beam direction and a corresponding receiver-side beam direction that jointly provide good connectivity between the network device and the terminal devices. The beam management includes initial beam establishment process, beam adjustment process, and beam recovery process. The initial beam establishment process includes a set of procedures and functions by which a beam pair is initially established in downlink and uplink transmission directions, for example, when a connection is established. The beam adjustment process is used to compensate for movements and rotations of the terminal devices and gradual changes in the environment. The beam recovery process is used to restore the beam connection when the current beam pair is disrupted due to rapid changes in the environment.

Typically, after the initial phase of the beam establishment, movement of the terminal devices and the changes in the environment, lead to blocking a currently established beam pair without enough time for the regular beam adjustment to adapt. Thus, such blocking of the currently established beam pair results in a beam failure event. Further, the terminal devices declare a beam failure event when an error probability for a physical downlink control channel (PDCCH) exceeds a certain value. It should be noted that the concept of beam failure resembles to the concept of radio-link failure (RLF), already defined for current radio-access technologies such as LTE. Like RLF, the terminal device declares a beam failure based on measurements of the quality of some reference signal. This is often expressed as measuring a hypothetical error rate. Further, the terminal device declares the beam failure based on measurements of a layer one (L1) reference signal received power (RSRP) i.e. L1-RSRP of a periodic channel state information reference signal (CSI-RS) or a Synchronization Signal (SS) block.

For every time instance, the measured L1-RSRP below a configured value, is defined as a beam failure instance. In one case, if the number of consecutive beam failure instances exceeds a configured value, then the terminal device declares a beam failure and initiates a beam recovery procedure. However, in areas with deep fade and blockage prone areas, the terminal device waits for N consecutive beam failure instances and thus results in unnecessary delay in declaring the beam failure. Further, in critical events that require stringent latency, for example, Ultra-Reliable Low-Latency Communication (URLLC), the unnecessary delay in declaring the beam failure results in disrupting the latency budget.

Further, in case of narrow beams, beam failure i.e. loss of connectivity due to rapid degradation of established beam pairs, is expected to occur more frequently as compared to the RLF, which typically corresponds to a terminal device moving out of coverage from the currently serving cell. Typically, the RLF implies a loss of coverage to the current serving cell in which case connectivity must be re-established to a new cell.

Currently, one or more methodologies are employed to overcome the above-mentioned beam failure events. In one case, after the beam failure, connectivity is often re-established using a new beam pair within the current cell. Consequently, recovery from the beam failure is achieved using lower-layer functionality, allowing for faster recovery as compared to the higher-layer mechanisms used to recover from the RLF.

In another case, New Radio (NR) specification includes specific procedures to handle such beam failure events, also referred to as beam failure recovery. The beam failure recovery procedure includes the steps of beam failure declaration, candidate beam identification, recovery request transmission, and network response. In the beam failure declaration, the terminal device is configured to declare that a beam failure has occurred. In the candidate beam identification, the terminal device is configured to identify a new beam pair for restoring connectivity. In the recovery-request transmission, the terminal device is configured to transmit a beam recovery request to the network, and thereafter to receive the network response to the beam recovery request. Further, RLF-recovery procedures are used to recover from beam failure events.

However, the above-mentioned techniques in declaring beam failure result in unnecessary delay. Therefore, there is a need for an improved method and apparatus to manage the beam failure in the 5G network, in order to minimize the delay in initiating the beam failure recovery procedure.

SUMMARY

In accordance with an example embodiment, a method for beam failure management for a user equipment (UE) may be disclosed. The method may comprise determining a beam failure instance counter (BFI_counter) indicative of a number of consecutive beam failure instances at the UE at a time instance, determining a location of the UE at the time instance, and determining a beam failure probability factor based at least on the location of the UE and the BFI_counter, wherein the beam failure probability factor is indicative of a probability of occurrence of a beam failure at the location of the UE, after a plurality of further time instances.

In one example embodiment, determining the location of the UE at the time instance may comprise receiving the location of the UE from a network device or determining the location of the UE using radio frequency (RF) fingerprinting. In another example embodiment, using the RF fingerprinting, UE radio measurements like Reference Signal Received Power (RSRP), may be correlated to the location of the UE. This provides the advantage of eliminating the transmission of UE location information from the network device to the UE.

The method may further comprise comparing the beam failure probability factor with a beam failure threshold probability, beamFailureThresholdProb, and if the beam failure probability factor is higher than the beamFailureThresholdProb, declaring a beam failure. Declaring the beam failure may comprise initiating a beam recovery procedure, in particular a random access procedure for a beam failure recovery. It should be noted that the beam failure probability factor may be determined by a trainable machine learning (ML) model. Such a declaration of the beam failure for the UE, helps in minimizing delay in initiating the beam recovery procedure for the beam failure recovery.

In accordance with another example embodiment, the method may be performed at the UE. The method may comprise the steps of receiving, from the network device, a request for activating ML-based functionalities, receiving, from the network device, the beamFailureThresholdProb and the trainable ML model, wherein the step of determining the location of the UE at the time instance may further comprise if the BFI_counter>0, requesting and receiving, from the network device, the location of the UE at the time instance. The BFI_counter is determined by counting beam failure instances indicated by the UE. In one example embodiment, the BFI_counter may be determined by counting beam failure instances indicated by one or more layers of the UE. The one or more layers may be associated with Medium Access Control (MAC) layer providing Radio Resource Management (RRM) services to the network device and the UE. Further, the one or more layers may be, but are not limited to, lower layers such as a physical layer, higher layers, or the MAC layer.

In accordance with yet another example embodiment, the method may be performed at the network device and the BFI_counter may be received from the UE.

In accordance with yet another example embodiment, a method for training a machine learning (ML) model at a network device may be disclosed. The method may comprise receiving, from at least one user equipment, (UE) a plurality of UE locations and a threshold, beamFailureInstanceMaxCount, the threshold being indicative of a maximal number of consecutive beam failure instances, determining a training set by labeling pairs comprising a UE location and a beam failure instance counter, BFI_counter, with a beam failure probability factor, wherein the BFI_counter takes values between 1 and the threshold, beamFailureInstanceMaxCount, and training the ML model using the labeled training set.

It should be noted that for each UE location and each beam failure instance counter, BFI_counter, the beam failure probability factor may be defined based at least on the BFI_counter, and the UE location, in particular the beam failure probability factor is defined as:

$$beamFailureProb(\text{location}, BFI\_COUNTER = n) = \frac{\text{No. of times beam failure occurs given that BFI\_COUNTER} = n \text{ at location}(X, Y)}{\text{No. of times BFI\_COUNTER} = n \text{ at location}(X, Y)}$$

wherein beamFailureProb is the beam failure probability factor, BFI_COUNTER is the beam failure instance counter, and location (X, Y) is the UE location. In one example embodiment, the UE location may correspond to a region around location (X, Y).

Further, the ML model may be trained to minimize a loss function defining a relationship between the beam failure probability factor and a beam failure probability, the beam failure probability indicating the probability that a beam failure occurs after beamFailureInstanceMaxCount time instances for a given value of the BFI_counter at the UE location.

In accordance with yet another example embodiment, an apparatus for beam failure management may be disclosed. The apparatus may comprise means for determining a beam failure instance counter (BFI_counter) indicative of a number of consecutive beam failure instances occurred at a user equipment (UE), at a time instance, determining a location of the UE at the time instance, and determining a beam failure probability factor based at least on the location of the UE and the BFI_counter, wherein the beam failure probability factor is indicative of a probability of occurrence of a beam failure at the location of the UE, after a plurality of further time instances.

In one example embodiment, determining the location of the UE at the time instance may comprise receiving the location of the UE from a network device or determining the location of the UE using radio frequency (RF) fingerprinting. In another example embodiment, using the RF fingerprinting, UE radio measurements like Reference Signal Received Power (RSRP), may be correlated to the location of the UE. This provides the advantage of eliminating the transmission of UE location information from the network device to the UE.

The apparatus may further comprise means for comparing the beam failure probability factor with a beam failure threshold probability, beamFailureThresholdProb, and if the beam failure probability factor is higher than the beamFailureThresholdProb, declaring a beam failure. Declaring the beam failure may comprise means for initiating a beam recovery procedure, in particular a random access procedure for a beam failure recovery. It should be noted that the beam failure probability factor may be determined by a trainable machine learning (ML) model. Such declaration of the beam failure for the UE, helps in minimizing delay in initiating the beam recovery procedure for the beam failure recovery.

In accordance with yet another example embodiment, the apparatus may be the UE and may be configured to receive, from the network device, a request for activating ML-based functionalities, receive, from the network device, the beamFailureThresholdProb and the trainable ML model, wherein the step of determining the location of the UE at the time instance may further comprise if the BFI_counter>0, requesting and receiving, from the network device, the location of the UE at the time instance. The BFI_counter is determined by counting beam failure instances indicated by the UE. In one example embodiment, the BFI_counter may be determined by counting beam failure instances indicated by one or more layers of the UE. The one or more layers may be associated with Medium Access Control (MAC) layer providing Radio Resource Management (RRM) services to the network device and the UE. Further, the one or more layers may be, but are not limited to, lower layers such as a physical layer, higher layers, or the MAC layer.

In accordance with yet another example embodiment, the apparatus may be the network device and may be further configured to receive the BFI_counter, from the UE.

In accordance with yet another example embodiment, an apparatus for training a machine learning (ML) model may be disclosed. The apparatus may comprise means for receiving, from at least one user equipment (UE), a plurality of UE locations and a threshold, beamFailureInstanceMaxCount, the threshold being indicative of a maximal number of consecutive beam failure instances, determining a training set by labeling pairs comprising a UE location and a beam failure instance counter (BFI_counter), with a beam failure probability factor, wherein the BFI_counter takes values between 1 and the threshold, and training the ML model using the labeled training set.

It should be noted that for each UE location and each beam failure instance counter, BFI_counter, the beam failure probability factor may be defined based at least on the BFI_counter, and the UE location, in particular the beam failure probability factor is defined as:

$$beamFailureProb\ (location, BFI\_COUNTER = n) = \frac{\text{No. of times beam failure occurs given that BFI\_COUNTER} = n \text{ at location}(X, Y)}{\text{No. of times BFI\_COUNTER} = n \text{ at location}(X, Y)}$$

wherein beamFailureProb is the beam failure probability factor, BFI_COUNTER is the beam failure instance counter, and location (X, Y) is the UE location. In one example embodiment, the UE location may correspond to a region around location (X, Y).

Further, the ML model may be trained to minimize a loss function defining a relationship between the beam failure probability factor and a beam failure probability, the beam failure probability indicating the probability that a beam failure occurs after beamFailureInstanceMaxCount time instances for a given value of the BFI_counter at the UE location.

In accordance with yet another example embodiment, a non-transitory computer-readable medium may be disclosed. The non-transitory computer readable medium may comprise instructions for causing a processor to perform functions, including determining a beam failure instance counter (BFI_counter) indicative of a number of consecutive beam failure instances occurred at a user equipment (UE) at a time instance, determining a location of the UE at the time instance, and determining a beam failure probability factor based at least on the location of the UE and BFI_counter, wherein the beam failure probability factor is indicative of a probability of occurrence of a beam failure at the location of the UE, after a plurality of further time instances.

In one example embodiment, determining the location of the UE at the time instance may comprise receiving the location of the UE from a network device or determining the location of the UE using radio frequency (RF) fingerprinting. In another example embodiment, using the RF fingerprinting, UE radio measurements like Reference Signal Received Power (RSRP), may be correlated to the location of the UE. This provides the advantage of eliminating the transmission of UE location information from the network device to the UE.

Further, the non-transitory computer-readable medium includes instructions for causing the processor to perform functions including comparing the beam failure probability factor with a beam failure threshold probability, beamFailureThresholdProb, and if the beam failure probability factor is higher than the beamFailureThresholdProb, declaring a beam failure. Declaring the beam failure may comprise initiating a beam recovery procedure, in particular a random access procedure for a beam failure recovery. It should be noted that the beam failure probability factor may be determined by a trainable machine learning (ML) model. Such declaration of the beam failure for the UE, helps in minimizing delay in initiating the beam recovery procedure for the beam failure recovery.

In accordance with another example embodiment, the non-transitory computer-readable medium includes instructions for causing the processor to perform functions at the UE. The non-transitory computer-readable medium includes instructions for causing the processor to perform functions including receiving, from the network device, a request for activating ML-based functionalities, receiving, from the network device, the beamFailureThresholdProb and the trainable ML model, wherein the step of determining the location of the UE at the time instance may further comprise if the BFI_counter>0, requesting and receiving, from the network device, the location of the UE at the time instance. The BFI_counter is determined by counting beam failure instances indicated by the UE. In one example embodiment, the BFI_counter may be determined by counting beam failure instances indicated by one or more layers of the UE. The one or more layers may be associated with Medium Access Control (MAC) layer providing Radio Resource Management (RRM) services to the network device and the UE. Further, the one or more layers may be, but are not limited to, lower layers such as a physical layer, higher layers, or the MAC layer.

In accordance with yet another example embodiment, the non-transitory computer-readable medium includes instructions for causing the processor to perform functions at the network device and including receiving the BFI_counter from the UE.

In accordance with yet another example embodiment, the non-transitory computer-readable medium includes instructions for causing the processor to perform functions including receiving, from at least one user equipment (UE), a plurality of UE locations and a threshold, beamFailureInstanceMaxCount, the threshold being indicative of a maximal number of consecutive beam failure instances, determining a training set by labeling pairs comprising a UE location and a beam failure instance counter (BFI_counter) with a beam failure probability factor, wherein the BFI_counter takes values between 1 and the threshold, beamFailureInstanceMaxCount, and training the ML model using the labeled training set.

It should be noted that for each UE location and each beam failure instance counter, BFI_counter, the beam failure probability factor may be defined based at least on the BFI_counter, and the UE location, in particular the beam failure probability factor is defined as:

$$beamFailureProb\ (location, BFI\_COUNTER = n) = \frac{\text{No. of times beam failure occurs given that BFI\_COUNTER} = n \text{ at location}(X, Y)}{\text{No. of times BFI\_COUNTER} = n \text{ at location}(X, Y)}$$

wherein beamFailureProb is the beam failure probability factor, BFI_COUNTER is the beam failure instance counter, and location (X, Y) is the UE location. In one example embodiment, the UE location may correspond to a region around location (X, Y).

Further, the ML model may be trained to minimize a loss function defining a relationship between the beam failure probability factor and a beam failure probability, the beam failure probability indicating the probability that a beam failure occurs after beamFailureInstanceMaxCount time instances for a given value of the BFI_counter at the UE location.

Altogether, the apparatus and algorithm according to the exemplary embodiments described herewith allow to proactively trigger the random access procedure specified in 3GPP TS 38.321. Instead of waiting for the BFI_counter to reach pre-defined beamFailureInstanceMaxCount, the random access procedure for the ML capable UEs (i.e. the UEs that support the trainable ML model) is triggered, when a beam failure is imminent. Such ML capable UEs may work in smart environments despite large memory requirements for storing ML models and extra computational power requirements to run them. Preferably, to proactively declare the beam failure, the disclosed method introduces a beam failure probability factor that is indicative of the probability of a beam failure to happen at a particular UE location. Such usage of machine learning (ML) or artificial intelligence (AI) model in 5G networks based at least on UE location history, may help in improving beam failure management. The UE location history as the ML model input may be helpful to determine the mobility and trajectory aspects of the UE. Further, such method and apparatus provide the advantage, in areas with deep fade or blockage prone areas, of minimizing any unnecessary delay in declaring the beam failure. Further, the UE does not wait for pre-defined consecutive beam failures. In addition, the disclosed method improves the performance of existing methods in the locations where the UE frequently suffers from beam failure. Without the use of the beam failure probability factor, the UE should wait for the pre-defined beamFailureInstanceMaxCount, which would result in unnecessary time delays in declaring the beam failure.

To the accomplishment of the foregoing and related ends, one or more aspects comprise the features hereinafter fully described and particularly pointed out in the claims. The following description and the annexed drawings outlined in detail certain illustrative aspects and are indicative of but a few of the various ways in which the principles of the aspects may be employed. Other advantages and novel features will become apparent from the following detailed description when considered in conjunction with the drawings and the disclosed aspects are intended to include such aspects and their equivalents.

BRIEF DESCRIPTION OF THE DRAWINGS

Further embodiments, details, advantages, and modifications of the present example embodiments will become apparent from the following detailed description of the embodiments, which is to be taken in conjunction with the accompanying drawings, wherein.

DETAILED DESCRIPTION

Some embodiments of this disclosure, illustrating its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to the listed item or items.

It should also be noted that as used herein and in the appended claims, the singular forms "a," "an," and "the" include plural references unless the context dictates otherwise. Although any apparatus and method similar or equivalent to those described herein can be used in the practice or testing of embodiments of the present disclosure, the apparatus and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

An example embodiment of the present disclosure and its potential advantages are understood by referring to FIGS. 1 through 13 of the drawings, like numerals being used for like and corresponding parts of the various drawings.

Figure 1:
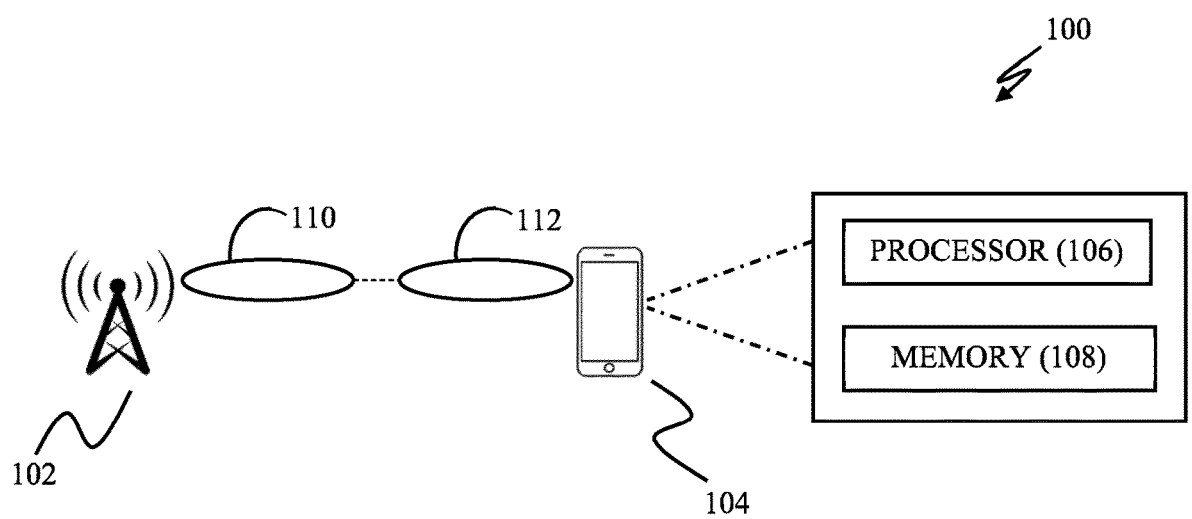
FIG. 1 illustrates a network diagram showing an apparatus for beam failure management for a user equipment (UE), according to an example embodiment of the subject matter described herein.

FIG. 1 illustrates a network diagram showing an apparatus 100 for beam failure management, according to an example embodiment. The apparatus 100 comprising a network device 102 connected to a terminal device 104 via a communication network (not shown). The communication network may be implemented using at least one communication technique selected from and not limiting to Visible Light Communication (VLC), Worldwide Interoperability for Microwave Access (WiMAX), Long term evolution (LTE), Wireless local area network (WLAN), Infrared (IR) communication, Public Switched Telephone Network (PSTN), Radio waves, and any other wired and/or wireless communication techniques.

The network device 102 may be, but is not limited to, Wireless Fidelity (Wi-Fi) access point, a base station, gNb, eNodeB (eNB), or radio station. The network device 102 may send information to the terminal device 104. In one example embodiment, the information may be related to the location of the terminal device 104. Further, the network device 102 may host training and learning of models such as, but are not limited to, machine learning (ML) models and deep learning models. Further, the network device 102 may comprise multiple antennas using which the network device 102 may generate different beams for terminal devices 104, placed in different directions. In one example embodiment, the network device 102 may be a 3rd Generation Partnership Project (3GPP) 5G Next Generation base station (gNB or gNodeB) which supports 5G New Radio (NR), as shown in FIG. 1.

Further, the network device 102 may comprise a processor (not shown) and a memory (not shown). The processor includes suitable logic, circuitry, and/or interfaces that are operable to execute instructions stored in the memory to perform various functions. The processor may execute an algorithm stored in the memory for beam failure management. The processor may also be configured to decode and execute any instructions received from one or more other electronic devices or server(s). The processor may include one or more general-purpose processors (e.g., INTEL® or Advanced Micro Devices® (AMD) microprocessors) and/or one or more special-purpose processors (e.g., digital signal processors or Xilinx® System On Chip (SOC) Field Programmable Gate Array (FPGA) processor). The processor may be further configured to execute one or more computer-readable program instructions, such as program instructions to carry out any of the functions described in the description.

The memory stores a set of instructions and data. Further, the memory includes one or more instructions that are executable by the processor to perform specific operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, cloud computing platforms (e.g. Microsoft Azure and Amazon Web Services, AWS), or other type of media/machine-readable medium suitable for storing electronic instructions.

The terminal device 104 may be a user equipment (UE) used directly by an end-user to communicate. Hereinafter, the terminal device 104 may be referred to as the UE 104. In an example embodiment, the UE 104 corresponds to a smartphone, as shown in FIG. 1. The UE 104 may be, but is not limited to, a computer, a telephone, a desktop, a personal digital assistant (PDA), or a laptop. Further, the UE 104 may comprise input or output interfaces like a display screen, a touch screen, an antenna, and/or a microphone. In one example embodiment, the touch screen may correspond to at least one of a resistive touch screen, capacitive touch screen, or a thermal touch screen.

Further, the UE 104 may comprise a processor 106 and a memory 108. The processor 106 includes suitable logic, circuitry, and/or interfaces that are operable to execute instructions stored in the memory 108 to perform various functions. The processor 106 may execute an algorithm stored in the memory 108 for beam failure management. The processor 106 may also be configured to decode and execute any instructions received from one or more other electronic devices or server(s). The processor 106 may include one or more general-purpose processors (e.g., INTEL® or Advanced Micro Devices® (AMD) microprocessors) and/or one or more special-purpose processors (e.g., digital signal processors or Xilinx® System On Chip (SOC) Field Programmable Gate Array (FPGA) processor). The processor 106 may be further configured to execute one or more computer-readable program instructions, such as program instructions to carry out any of the functions described in the description.

The memory 108 stores a set of instructions and data. Further, the memory 108 includes one or more instructions that are executable by the processor 106 to perform specific operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, cloud computing platforms (e.g. Microsoft Azure and Amazon Web Services, AWS), or other type of media/machine-readable medium suitable for storing electronic instructions.

It will be apparent to one skilled in the art that the above-mentioned components of the network device 102 and the UE 104 have been provided for illustration purposes, without departing from the scope of the disclosure.

Referring to FIG. 1, the network device 102 and the UE 104 may communicate with each other using a beam pair. The beam pair may comprise a transmitter-side beam direction 110 and a corresponding receiver-side beam direction 112, jointly providing good connectivity between the network device 102 and the UE 104. It should be noted that such communication may take place in the 5G network, without departing from the scope of the disclosure. The beam pair may be established in downlink and uplink transmission directions, for example, when a connection is established, using a set of procedures and functions performed by beam management. After the establishment of the beam pair, movements and rotations of the UE 104 and gradual changes in the communication network, may lead to blocking an established beam pair. Thus, such blocking of the beam pair may result in a beam failure.

Figure 2:
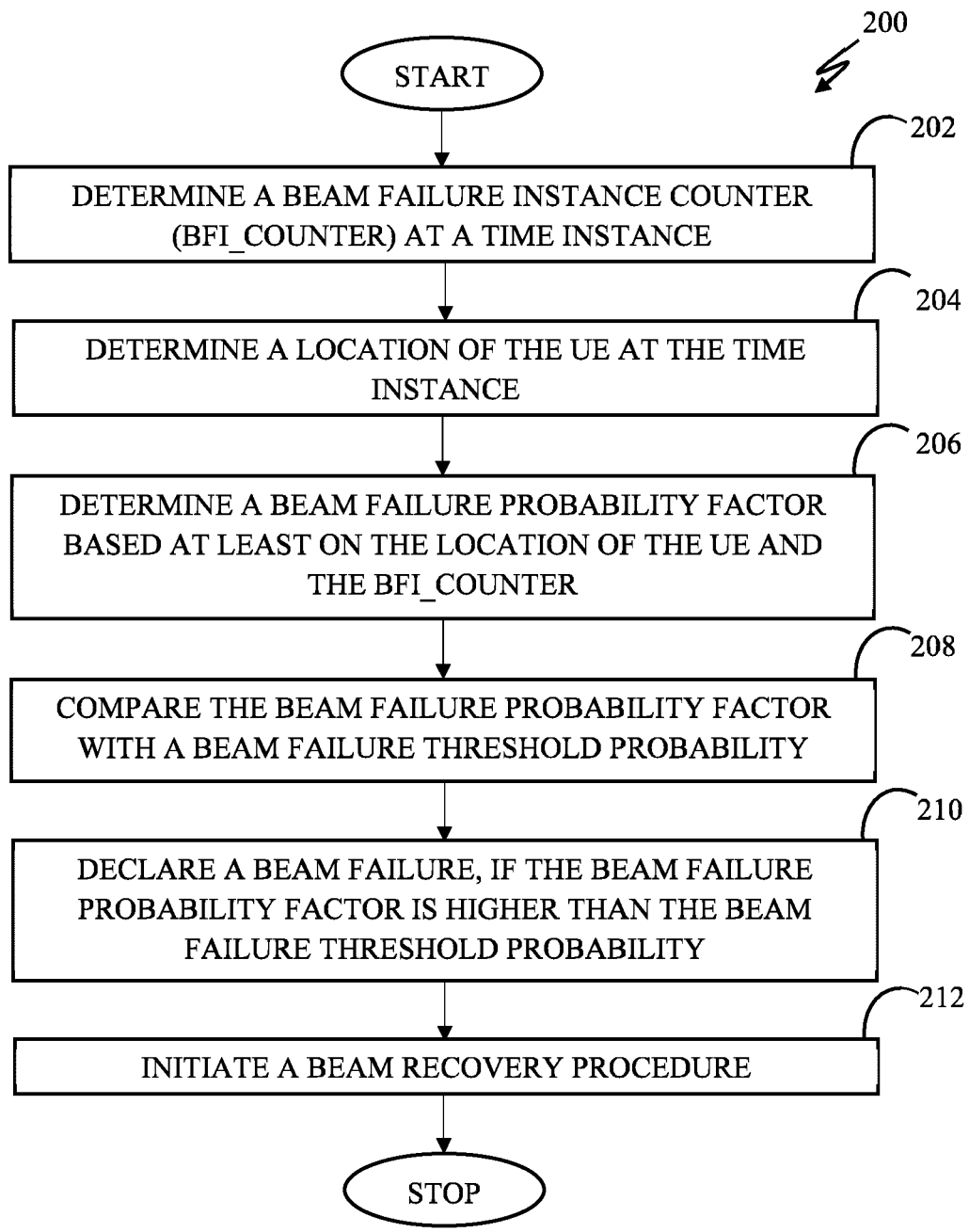
FIG. 2 illustrates a flowchart showing a method for the beam failure management for the UE, according to an example embodiment of the subject matter described herein.

FIG. 2 illustrates a flowchart 200 showing a high level operation of a method for beam failure management for the UE 104, according to an example embodiment. FIG. 2 is described in conjunction with FIG. 1.

At first, a beam failure instance counter (BFI_counter) may be determined, at step 202. The BFI_counter may be indicative of a number of consecutive beam failure instances at the UE 104, at a time instance. Successively, a location of the UE 104 may be determined at the time instance, at step 204. In one example embodiment, the location of the UE 104 may be received from the network device 102. In another example embodiment, the location of the UE 104 may be determined using radio frequency (RF) fingerprinting. In another example embodiment, using the RF fingerprinting, UE radio measurements like Reference Signal Received Power (RSRP), may be correlated to the location of the UE 104. The UE radio measurements may be a layer one (L1) reference signal received power (RSRP) i.e. L1-RSRP from best beams of a serving cell or L1-RSRP from serving and neighboring cells. Such usage of the UE radio measurements may eliminate the need of receiving location of the UE 104 from the network device 102. Another advantage of this embodiment is the elimination of the transmission of the location of the UE 104 from the network device 102 to the UE 104. Further, the UE radio measurements in 5G NR may be performed natively by the UE 104. It should be noted that such radio measurements may provide a tight mapping between the radio measurements and the location of the UE 104.

Successively, a beam failure probability factor may be determined based at least on the location of the UE 104 and the BFI_counter, at step 206. In one example embodiment, the beam failure probability factor may be determined by a trainable machine learning, ML, model. Further, the beam failure probability factor may be indicative of a probability of occurrence of a beam failure at the location of the UE 104, after a plurality of further time instances. Successively, the beam failure probability factor may be compared with a beam failure threshold probability, beamFailureThreshold-Prob, at step 208. Based at least on the comparison, a beam failure may be declared if the beam failure probability factor is higher than the beamFailureThresholdProb, at step 210. In one example embodiment, the beamFailureThresholdProb may be set to a very high value (i.e. 0.9-1) to ensure that proactive beam recovery procedure starts only when the ML model confidence is very high. Thereafter, a beam recovery procedure may be initiated, at step 212. In particular, a random access procedure may be initiated for a beam failure recovery.

Figure 3:
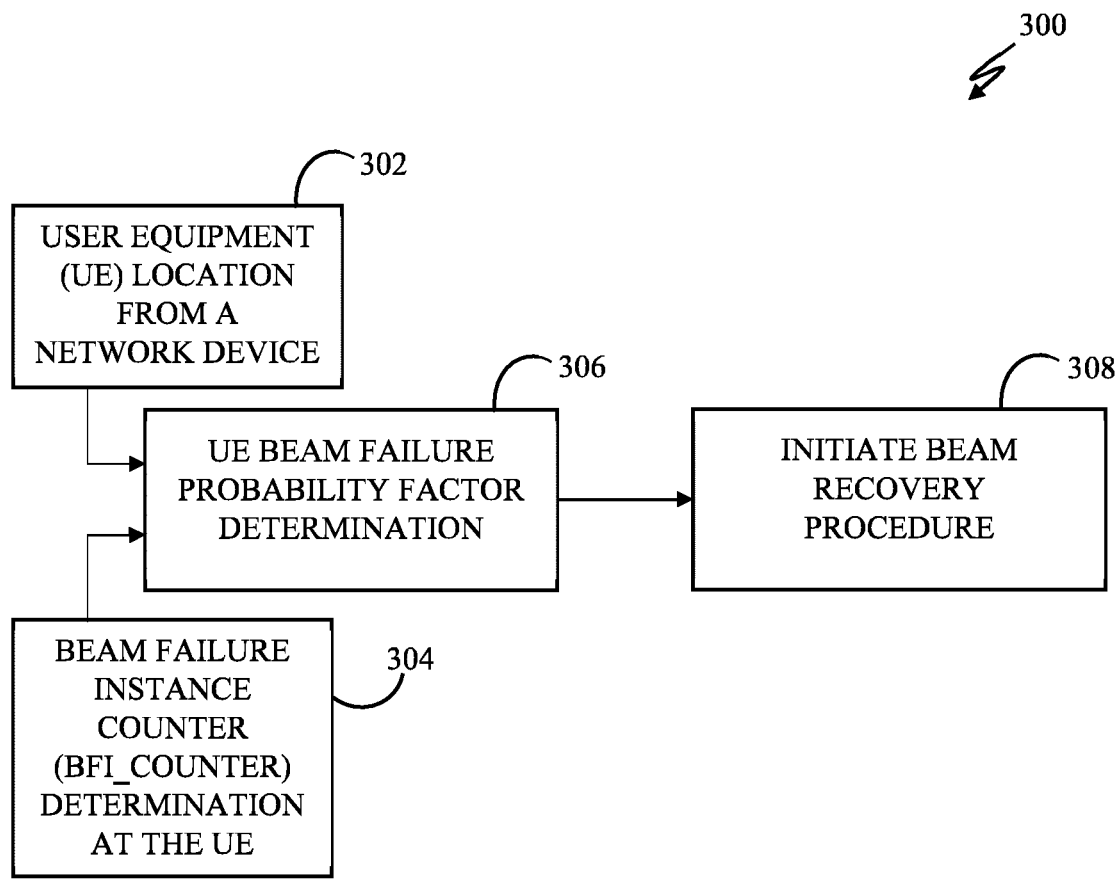
FIG. 3 illustrates a block diagram showing a high-level operation of a method for beam failure management at a user equipment (UE), for initiating a beam recovery procedure, according to an example embodiment of the subject matter described herein.

FIG. 3 illustrates a block diagram 300 showing a high-level operation of a method for beam failure management at the UE 104, according to an example embodiment. FIG. 3 is described in conjunction with FIG. 1. Preferred steps of the method for beam failure management at the UE 104 according to further embodiments are illustrated in FIGS. 4A, 4B, and 4C.

At first, location information of the UE 104 is received from the network device 102 at a time instance, at block 302. In one example embodiment, the processor 106 may receive the location information of the UE 104, from the network device 102. The location information may comprise location coordinates of the UE 104. In addition, the BFI_counter is determined at the UE 104, at block 304. In one example embodiment, the processor 106 may determine the BFI_counter at the UE 104. The BFI_counter may be indicative of a number of consecutive beam failure instances at the location of the UE 104. Successively, based at least on the location information of the UE 104 at the time instance and the BFI_counter, a beam failure probability factor (beamFailureProb) may be determined, at block 306. In one example embodiment, the beamFailureProb may be determined by a trainable machine learning (ML) model. Further, the beamFailureProb may be compared with a beam failure threshold probability (beamFailureThresholdProb). Based at least on the comparison, a beam failure may be declared if the beam failure probability factor is higher than the beamFailureThresholdProb. Thereafter, a beam recovery procedure may be initiated, at block 308. The beam recovery procedure may include a random access procedure for a beam failure recovery. It should be noted that the beam recovery procedure may be used to restore the beam connection between the network device 102 and the UE 104 when the current beam pair is disrupted.

Figure 4A:
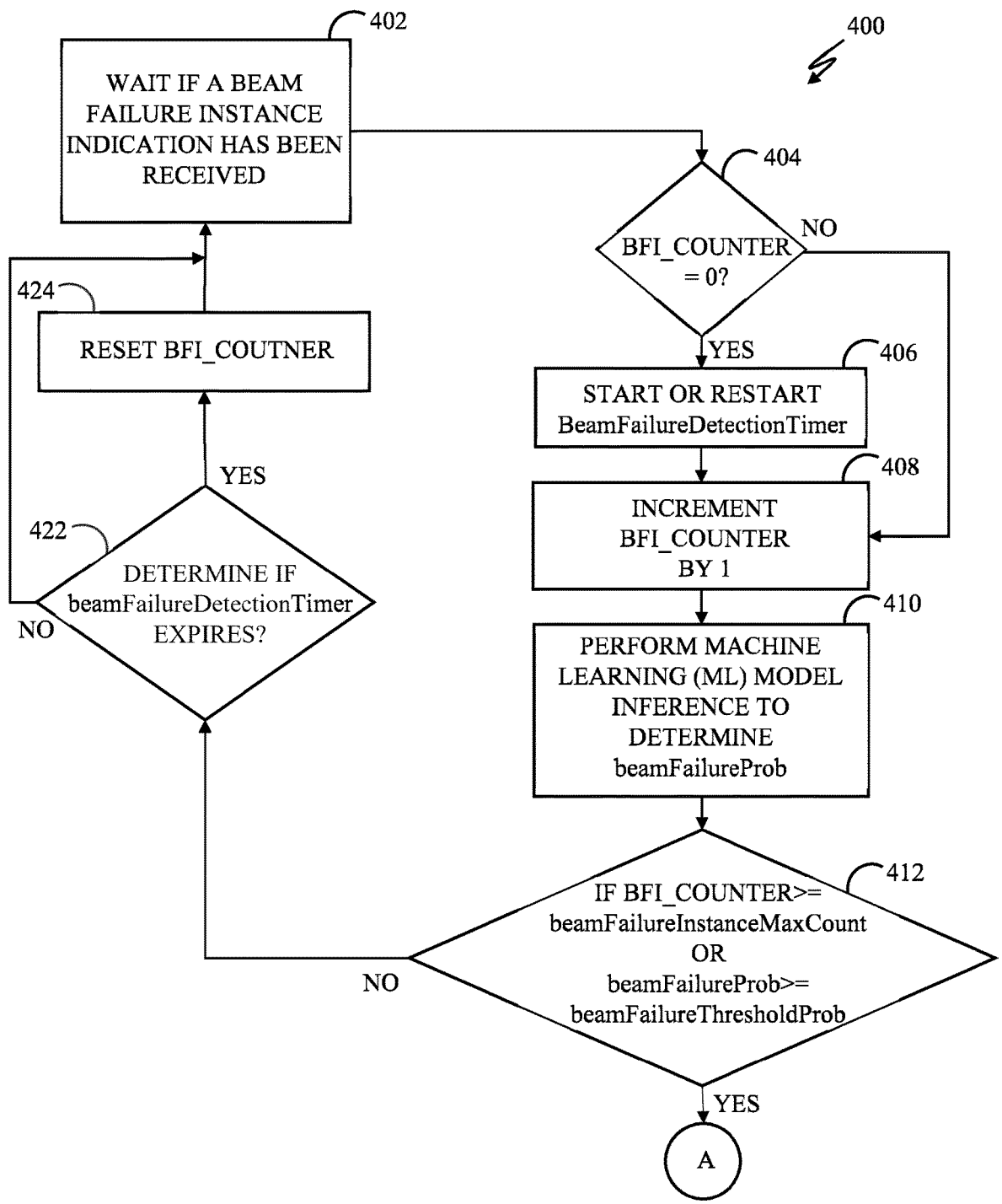
FIGS. 4A and 4B illustrate a flowchart showing a method for the beam failure management at a user equipment (UE) using a machine learning (ML) model, according to an example embodiment of the subject matter described herein.
Figure 4B:
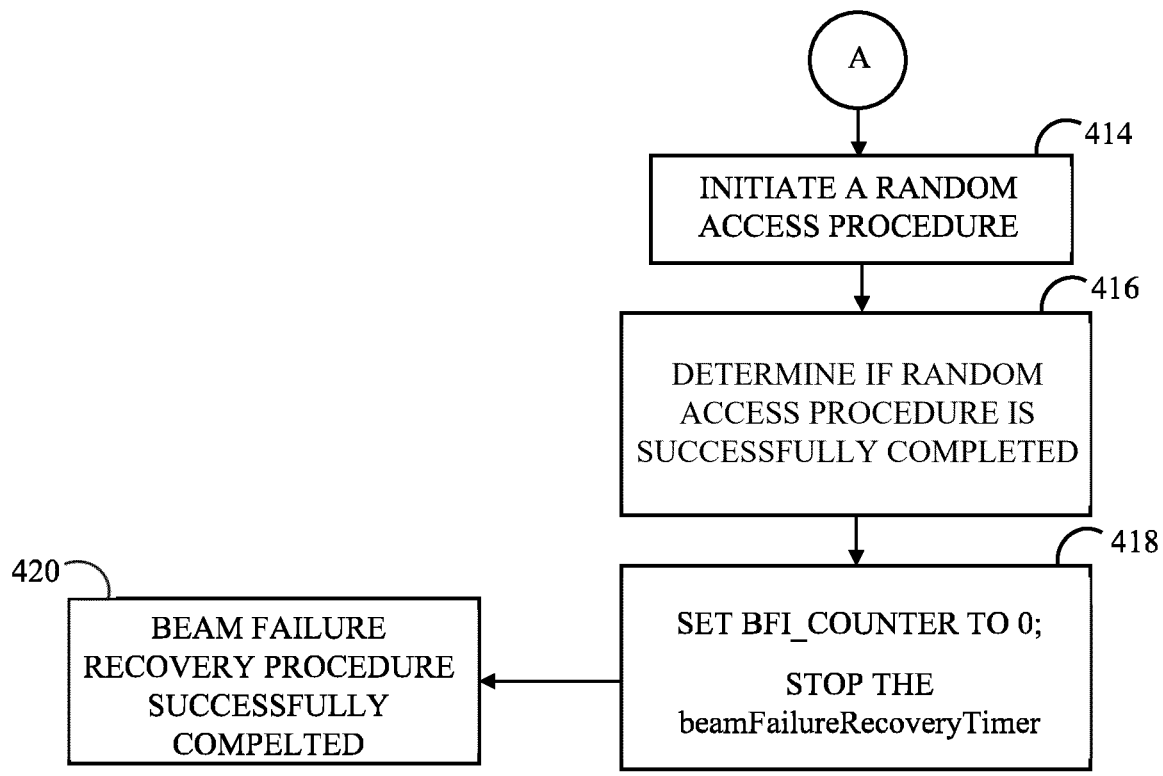
Figure 4C:
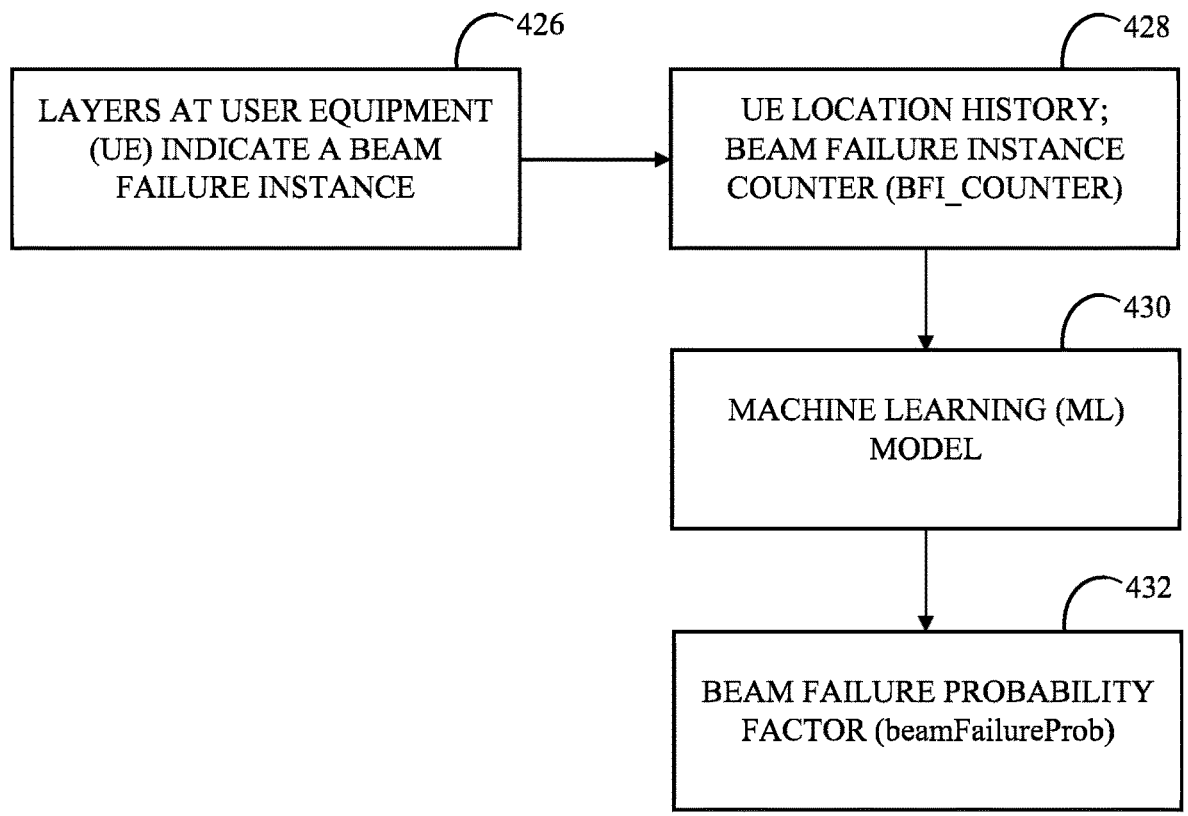
FIG. 4C illustrates a block diagram showing an ML model inference, according to an example embodiment of the subject matter described herein.

FIGS. 4A and 4B illustrate a flowchart 400 showing a method for beam failure management at the UE 104, using a machine learning (ML) model, according to an example embodiment. FIGS. 4A and 4B are described in conjunction with FIG. 4C.

At first, the processor 106 may determine whether a beam failure instance indication has been received at the UE 104, at step 402. In one example embodiment, the beam failure instance indication may be received from layers (shown as 426 in FIG. 4C). The layers (as per IEEE standards) may describe or control how information moves between two entities, in this case the network device 102 and the UE 104. Further, the layers may be associated with the Medium Access Control (MAC) layer providing Radio Resource Management (RRM) services to the network device 102 and the UE 104. Further, the layers may be, but are not limited to, lower layers such as a physical layer, an application layer, MAC layer, or higher layers. Successively, the processor 106 may determine whether a beam failure instance counter (BFI_counter) is equal to zero, at step 404. In one case, if the BFI_counter is equal to zero, then the processor 106 may start or restart a beamFailureDetectionTimer, at step 406. The beamFailureDetectionTimer may be indicative of beam failure detection timing. Successively, the BFI_counter is incremented by 1, at step 408. In one example embodiment, the processor 106 may increment the BFI_counter by 1.

In another case, if the BFI_counter is not equal to zero, then the processor 106 may increment the BFI_counter by 1, at step 408. Successively, an ML model inference is performed to determine a beam failure probability factor (beamFailureProb), at step 410. In one example embodiment, the processor 106 may perform the ML model inference (shown as 430 in FIG. 4C) to determine the beamFailureProb (shown as 432 in FIG. 4C). In another example embodiment, the ML model inference may be performed at the UE 104, for declaring a beam failure. In one example embodiment, the beamFailureProb may be determined based at least on location of the UE 104 and the BFI_counter. The location of the UE 104 may be received from the network device 102. In another example embodiment, the beamFailureProb may be determined based at least on UE location history and the BFI_counter (shown as 428 in FIG. 4C). The UE location history may include location (X, Y) at time, t, location (X, Y) at time, t−1, location (X, Y) at time, t−2, and so on.

In yet another example embodiment, for each set of location (X (t), Y (t) and X (t−1), Y (t−1)), a vector of the beamFailureProb may be determined corresponding to each possible BFI_counter=[1, 2, 3, . . . beamFailureInstanceMaxCount]. The beamFailureInstanceMaxCount may be indicative of a maximal number of consecutive beam failure instances. It should be noted that for the same location variables, higher BFI_counter value may result in large beamFailureProb. In one example embodiment, the ML model such as a supervised learning model may be used, where data is collected for each location and the UE 104 may be observed over consecutive time instances to determine whether UE beam failure happens or not. Further, the ML model predicts the beamFailureProb with every new beam failure instance. Further, the number of instances when the UE 104 suffers beam failures may be determined to compute the probability. The beamFailureProb may be defined as:

beamFailureProb=Pr(beam failure occurs after beamFailureInstanceMaxCount instances|Given that $BFI_{counter}$=n at location(X,Y)

With the help of the ML model, the beamFailureProb may evaluate the chances that a beam failure will happen after beamFailureInstanceMaxCount, as a function of UE current location and the BFI_counter. Successively, the processor 106 may determine whether the beamFailureProb is greater than or equal to a beam failure threshold probability (beamFailureThresholdProb) or the BFI_counter is greater than or equal to beam failure instance max count (beamFailureInstanceMaxCount), at step 412. In one case, the beamFailureThresholdProb may be set to a very high value (i.e. 0.9-1) to ensure that proactive beam recovery procedure starts only if ML model confidence is very high. In another case, the beamFailureInstanceMaxCount may be defined as a threshold on the maximum number of consecutive beam failure instances. In one example embodiment, such condition may be executed proactively. The following condition may be defined as:

BFI_COUNTER>=beamFailureInstanceMaxCount

OR beamFailureProb>=beamFailureThresholdProb

In one example embodiment, at the location (X, Y), if the consecutive number of beam failures represented by the BFI_counter is less than the beamFailureInstanceMaxCount, then a predicted beam failure with high probability may be determined. Further, the (beamFailureInstanceMaxCount-BFI_counter) instances may be known beforehand that a beam failure will occur after the beamFailureInstanceMaxCount beam failure instances.

Successively, if the above mentioned condition is satisfied, then a random access procedure is initiated, at step 414. In one example embodiment, the processor 106 may initiate the random access procedure for a beam failure recovery. It should be noted that the beam recovery procedure i.e. random access procedure may be initiated, after the beamFailureInstanceMaxCount consecutive beam failures. Such use of the beamFailureInstanceMaxCount may ensure that the beam recovery procedure is initiated and prevents any delay beyond the beamFailureInstanceMaxCount. Successively, the processor 106 may determine whether the random access procedure is successfully completed, at step 416. Based at least on the determination, the processor 106 may set the BFI_counter t zero and stop beamFailureRecoveryTimer, at step 418. Thereafter, a beam failure recovery procedure is successfully completed, at step 420. In one example embodiment, the UE 104 may be notified about the completion of the beam failure recovery procedure.

In another case, if the above mentioned condition is not satisfied, at step 412, then the processor 106 may determine whether a beamFailureDetectionTimer expires, at step 422. In one case, if the beamFailureDetectionTimer expires, then the processor 106 may reset the BFI_counter, at step 424. Thereafter, the processor 106 may again determine whether a beam failure instance indication has been received from the layers of the UE 104, at step 402. In another case, if the beamFailureDetectionTimer does not expire, then the processor 106 may directly follow the step 402.

Thus, the performance of the current method is lower bounded by the existing solution in 3GPP. Such use of the beamFailureProb eliminates the need to wait for the BFI_counter to reach the beamFailureInstanceMaxCount.

Figure 5:
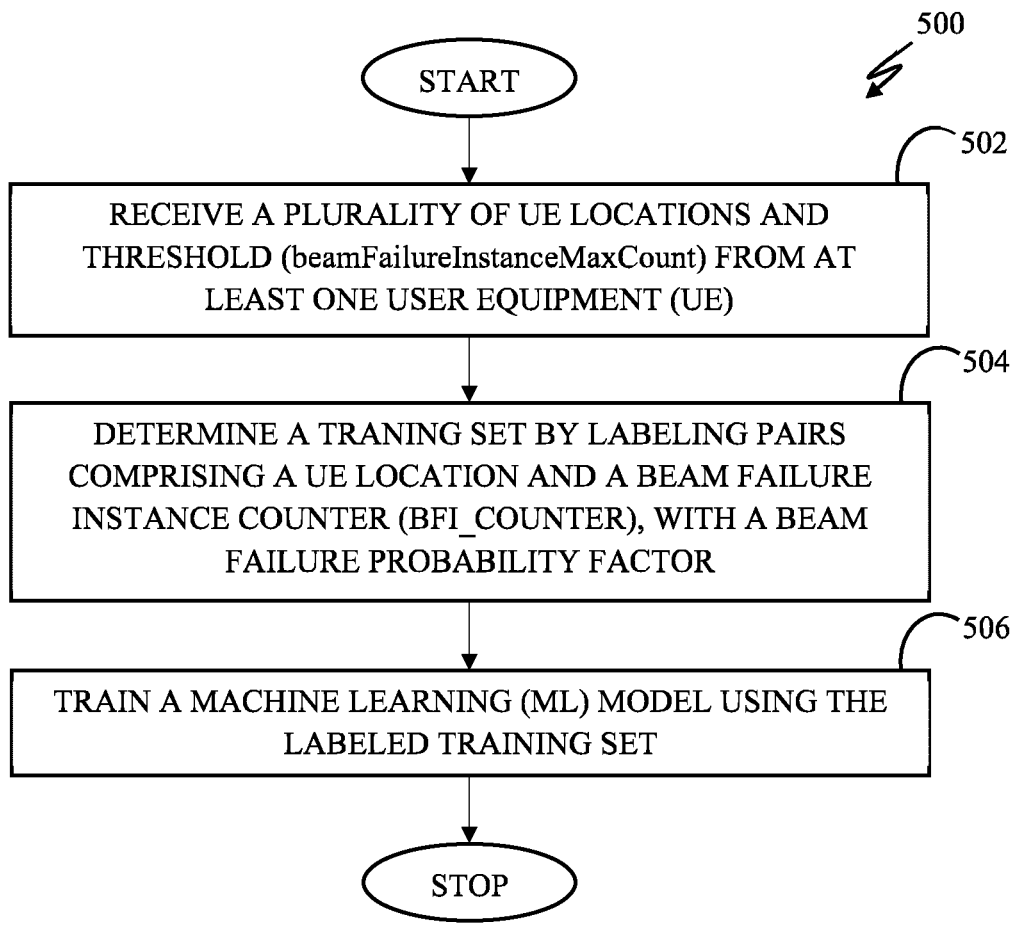
FIG. 5 illustrates a flowchart showing a method for training a machine learning (ML) model at a network device, according to an example embodiment of the subject matter described herein.

FIG. 5 illustrates a flowchart 500 showing a method for training a machine learning (ML) model, at a network device 102, according to an example embodiment. At first, a plurality of UE locations and a threshold (beamFailureInstanceMaxCount) are received, at step 502. The plurality of UE locations and the threshold may be received from at least one user equipment (UE) 104. The threshold may be indicative of a maximal number of consecutive beam failure instances. Successively, a training set may be determined by labeling pairs comprising a UE location and a beam failure instance counter, BFI_counter, with a beam failure probability factor, at step 504. The BFI_counter may take values between 1 and the threshold. In an example, a threshold (beamFailureInstanceMaxCount) is set as 10, at a location (X, Y), and BFI_counter is set as 6, then a beam failure probability factor is determined by observing a number of times beam failure happens after 4 more time instances. Further, if the beam failure happens, then the beam failure probability factor increases at that BFI_counter value and at the location (X, Y). It should be noted that such method may be repeated for every sampled point location (X, Y) and different values of the UE location and the BFI_counter to determine the labeled training set for training the ML model. In one alternate embodiment, for a particular location, beam failure probability factors of multiple UEs may be used for training the ML model.

In one example embodiment, the training of the ML model may be performed using one or more parameters listed in Table 1. The one or more parameters may include, but are not limited to, location X(t), location Y(t), location X(t−1), location Y(t−1), BFI_counter, and a labeled output beamFailureProb.

TABLE 1

| Location X(t) | Location Y(t) | Location X(t-1) | Location Y(t-1) | BFI_COUNTER | Labeled output beam FailureProb |
|---|---|---|---|---|---|
| X1(t) | Y1(t) | X1(t-1) | Y1(t-1) | 1 | A |
|  |  |  |  | 2 | ... |
|  |  |  |  | ... | ... |
|  |  |  |  | beamFailureInstanceMaxCount | ... |
| X1(t) | Y1(t) | X1'(t-1) | Y1'(t-1) | 1 | ... |
|  |  |  |  | ... | ... |
|  |  |  |  | beamFailureInstanceMaxCount | ... |

As shown in Table 1, during the training, for each pair of current and past locations i.e. UE location history, beamFailureInstanceMaxCount values of the beamFailureProb are determined. Successively, for the same current location, a different past location is selected and then the beamFailureInstanceMaxCount values of the beamFailureProb are determined. In one example embodiment, the beam failure probability factor may be determined based at least on the BFI_counter, and location (X, Y) of the UE 104, for each UE location and each BFI_counter. The beam failure probability factor may be defined as:

$$beamFailureProb \text{ (location, BFI\_COUNTER} = n) = \frac{\text{No. of times beam failure occurs given that BFI\_COUNTER} = n \text{ at location}(X, Y)}{\text{No. of times BFI\_COUNTER} = n \text{ at location }(X, Y)}$$

wherein, beamFailureProb is the beam failure probability factor, BFI_counter is the beam failure instance counter, and location (X, Y) is the UE location.

In one example embodiment, the UE location may correspond to a region around location (X, Y) of the UE 104. It should be noted that the labeled training set may be populated with more past samples such as X(t−2), Y(t−2), X(t−3), Y (t−3), and so on, to improve the accuracy of the ML model at the cost of large complexity. Thereafter, the ML model may be trained using the labeled training set, at step 506. It should be noted that the above-mentioned definition of the beam failure probability factor has been provided only for illustration purpose, without departing form the scope of the disclosure.

Figure 6:
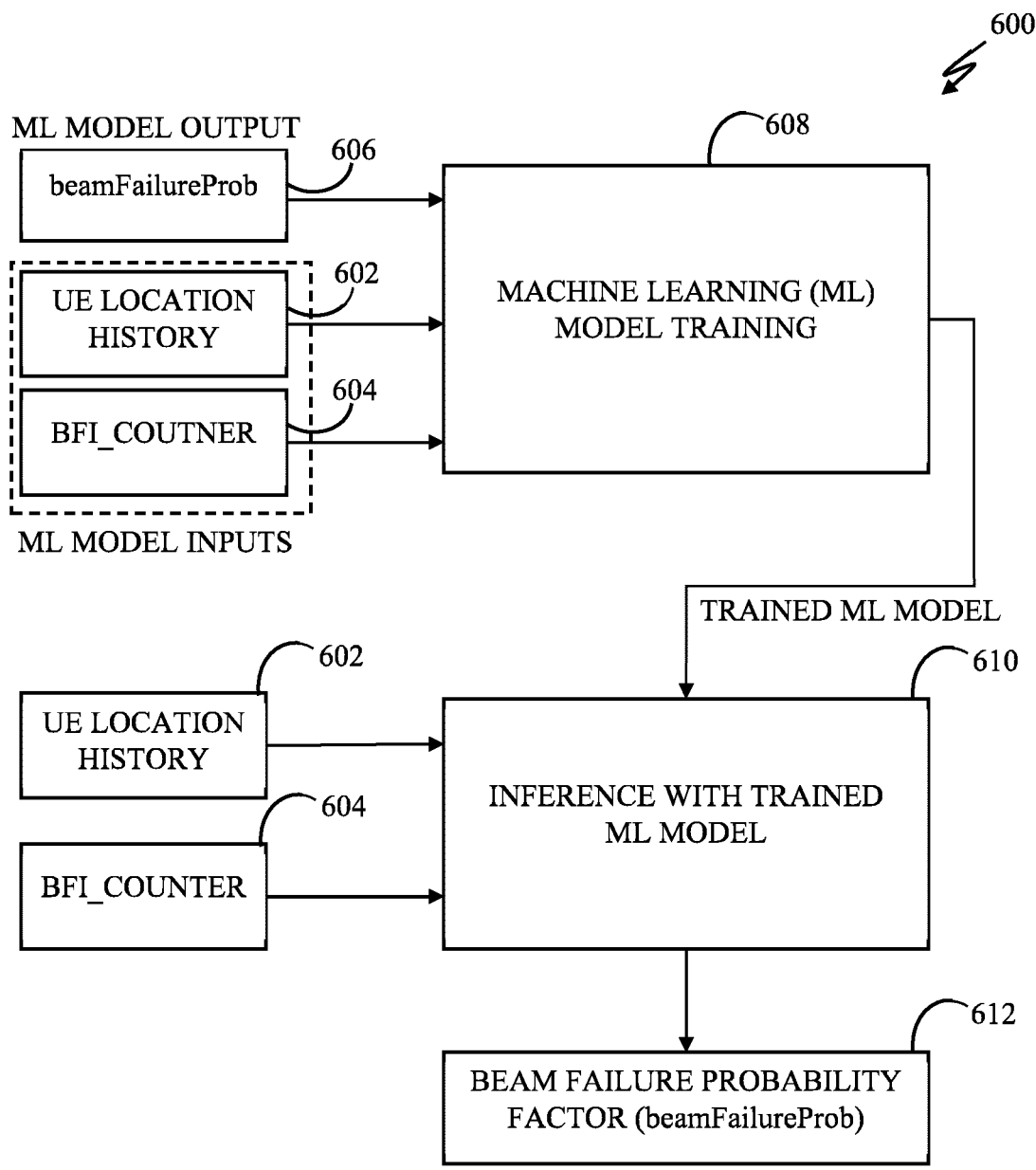
FIG. 6 illustrates a block diagram showing a method for training the ML model at a network device and inference with the trained ML model, according to an example embodiment of the subject matter described herein.

FIG. 6 illustrates a block diagram 600 showing a method for training the ML model and inference with the trained ML model, according to an example embodiment. FIG. 6 is described in conjunction with FIGS. 3, 4A, 4B, 4C, and 5. Preferred steps of the method for declaring the beam failure at the UE 104 according to further embodiments are illustrated in FIG. 6.

The method may be performed in two phases i.e. an offline training phase and an ML model inference phase. Firstly, the offline training phase may be performed at the network device 102, where information comprising ML model inputs such as, but are not limited to, UE location history (shown as 602) and BFI_counter (shown as 604), and ML model output such as beamFailureProb (shown as 606). The information may be provided as input for an ML model training (shown as 608). The UE location history (shown as 602) as the ML model input may be helpful to determine the mobility and trajectory aspects of the UE 104. Successively, the training set may be determined by labeling pairs comprising a UE location and a beam failure instance counter, BFI_counter, with a beam failure probability factor, as discussed above. The BFI_counter may take values between 1 and the threshold. Thereafter, the ML model may be trained based at least on the ML model inputs and ML model output, to obtain a trained ML model.

Successively, the trained ML model may be used for inference (shown as 610) along with ML model inputs such as the UE location history (shown as 602) and the BFI_counter (shown as 604). Based at least on the UE location history (shown as 602), the BFI_counter (shown as 604), and the trained ML model, a beam failure probability factor (beamFailureProb) (shown as 612) may be determined. Thereafter, the beamFailureProb (shown as 612) may be used for beam failure management. It should be noted that the beamFailureProb (shown as 612) may be used for training the ML model (shown as 608) and may be helpful for optimizing beam failure management. Thus, such ML model may be trained to minimize the error between decisions proposed and an actual beam failure event e and a beam failure declaration made before waiting for beamFailureInstanceMaxCount consecutive beam failures.

In one example embodiment, the ML model may be trained to minimize a loss function defining a relationship between the beam failure probability factor and a beam failure probability. The beam failure probability may indicate the probability that a beam failure occurs after beamFailureInstanceMaxCount time instances for a given value of the BFI_counter at the UE location. Thereafter, the trained ML model may be used for inference, where the beamFailureProb may be inferred as a function of UE location history and the BFI_counter. The loss function may include, but is not limited to, Minimum Mean Square Error (MSE) or Entropy. In particular, the MSE function may be defined as:

$$\frac{(y - y^p)^2}{\#samples}$$

where y is the beamFailureProb, $y^p$ is the probability that a beam failure will occur at a certain location (X, Y) at an observation point, t.

Successively, the beamFailureProb may be compared with a beam failure threshold probability (beamFailureThresholdProb). The beamFailureThresholdProb may be configured at the UE 104. Further, the value of beamFailureThresholdProb may be optimized during a training phase. In one example embodiment, a very high value of beamFailureThresholdProb may minimize the gain of the disclosed method and a very low value may increase false beam failure indications. Successively, if the beam failure probability factor is higher than the beam failure threshold probability, beamFailureThresholdProb, then a beam failure may be declared and a beam recovery procedure may be initiated, regardless of BFI_counter values. It should be noted that such independence from the BFI_counter may provide a proactive beam failure declaration in the areas where beam failure happens too frequently for a majority of UEs and waiting for the beamFailureInstanceMaxCount cause delays in initiating the beam recovery procedure. Thus, the use of ML-based method provides proactive beam failure declaration and triggers the beam recovery procedure, in order to identify and establish a new beam pair for communication between the network device 102 and the UE 104.

In one example embodiment, pseudocode for an ML-assisted beam failure management at the UE 104 is given as:

if beam failure instance indication is received from lower layers:

if BFI_counter=0 start the beamFailureDetectionTimer;

BFI_counter=BFI_counter+1;

beamFailureProb=ML (UE location, BFI_counter)
if beamFailureProb>=beamFailureThresholdProb or BFI_counter>=beamFailureInstanceMaxCount;
initiate a Random Access procedure.

It should be noted that above mentioned the UE location history and the BFI_counter as input for ML-assisted beam failure declaration, have been provided only for illustration purposes. In another example embodiment, other information such as, but is not limited to, radio propagation related parameters may be added to input features if such information improves the probability of beam failure declaration, without departing from the scope of the disclosure. Further, after the trained ML model infers the beamFailureProb and the beamFailureProb is greater than the beamFailureThresholdProb, a beam failure is declared instead of waiting for beamFailureInstanceMaxCount beam failure instances.

Figure 7:
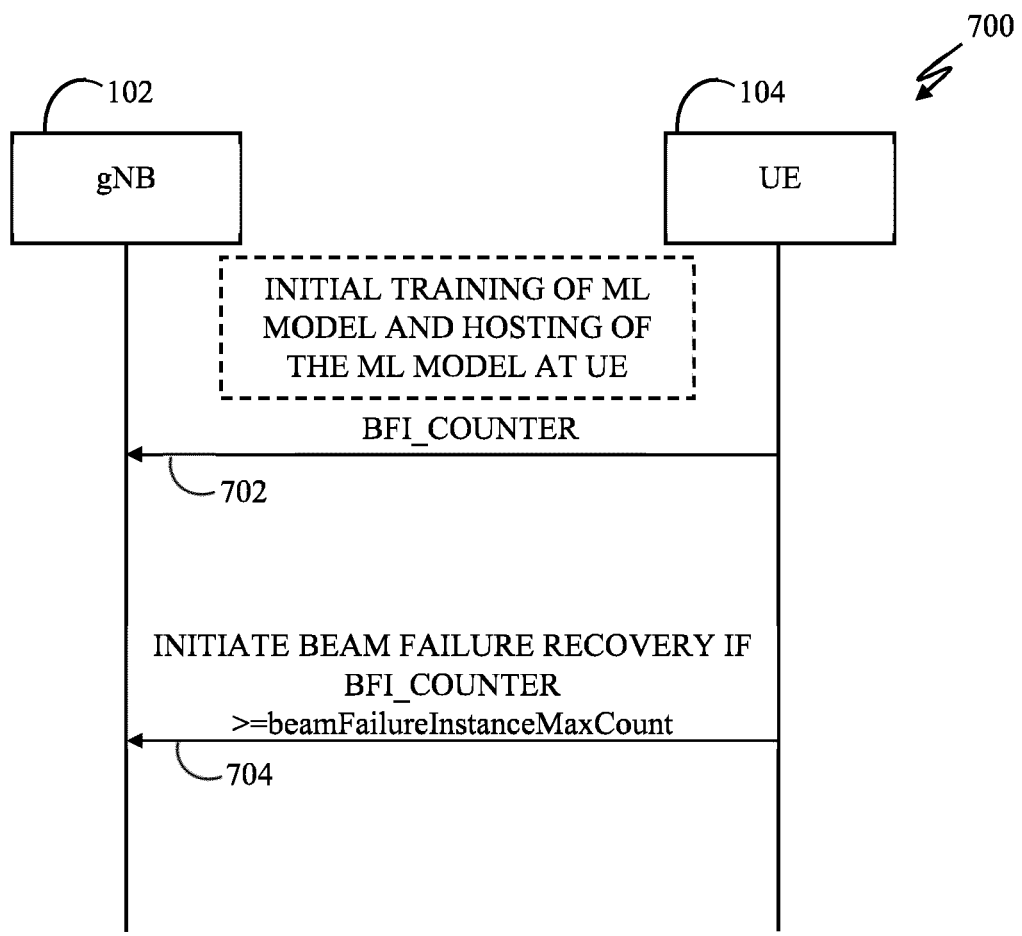
FIG. 7 illustrates a signaling diagram for implementation of training of the ML model, according to an example embodiment of the subject matter described herein.

FIG. 7 illustrates a signaling diagram 700 for implementation of the training of the ML model, according to an example embodiment. At first, when the BFI_counter is greater than zero, the UE 104 may send a value of the BFI_counter to a network device 102 i.e. gNB 102, at step 702. It should be noted that the training of ML model may be performed at the gNB 102. Further, UE location information i.e. location data of the UE 104 and the BFI_counter may be combined as a feature vector. The location data of the UE 104 may be available at the gNB 102. In one example embodiment, the UE location information may be available from Minimization of drive tests (MDT) trace. Further, to label the location data, the UE 104 may need to be observed for multiple instances, if the BFI_counter is increasing, and thereafter beam recovery procedure is initiated by the UE 104, at step 704. In one example embodiment, if the BFI_counter is reset before reaching the beamFailureInstanceMaxCount, the location data associated with the UE 104 may be labeled as zero for counting the beamFailureProb. It should be noted that the BFI_counter may be continuously sent to the gNB 102 when the BFI_counter is greater than zero.

Figure 8:
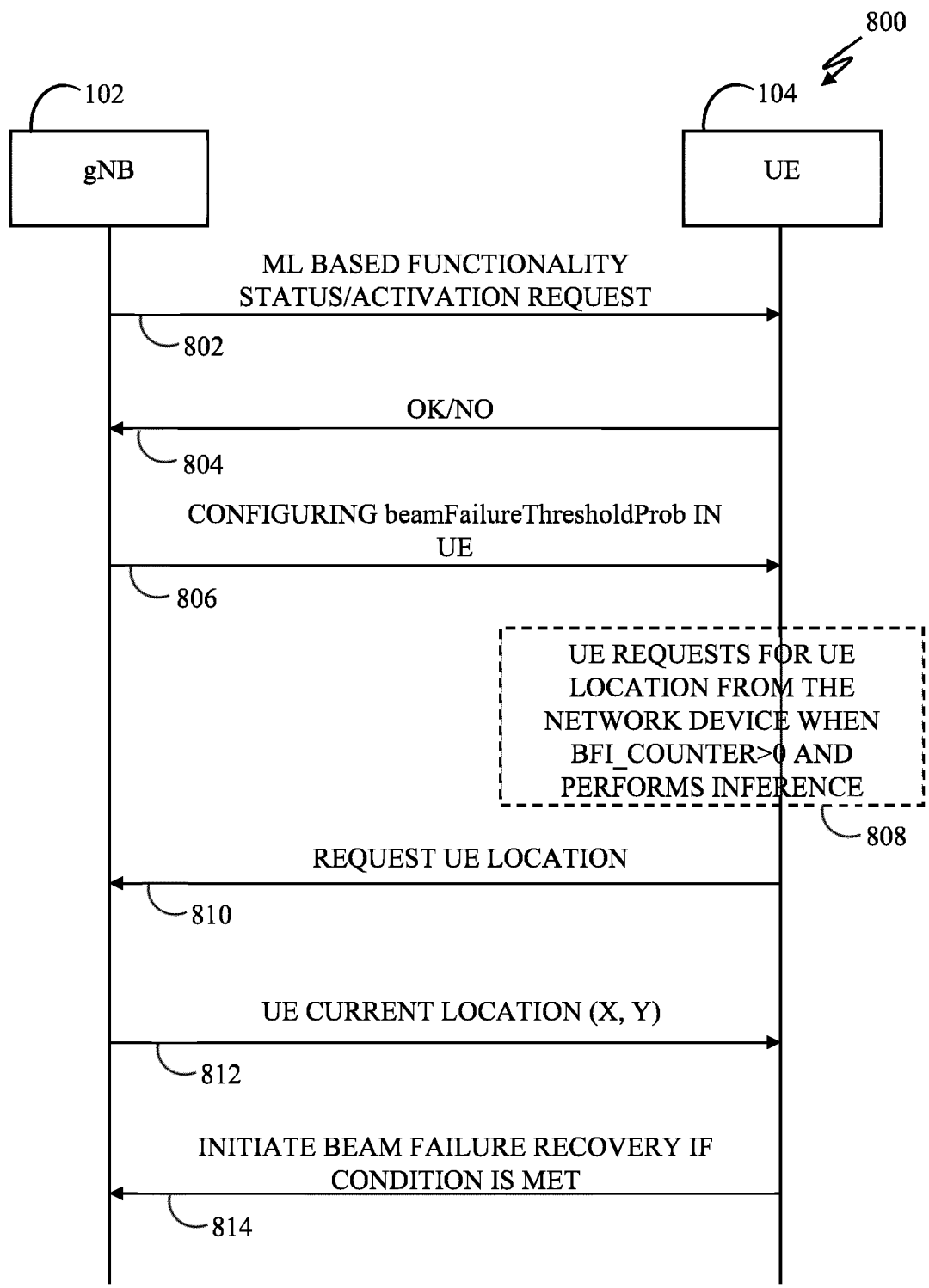
FIG. 8 illustrates a signaling diagram showing a method for beam failure management, where an ML model inference is performed at a user equipment (UE), according to an example embodiment of the subject matter described herein.

FIG. 8 illustrates a signaling diagram 800 showing a method for beam failure management, where an ML model inference is performed at the UE 104 and hosted at the UE 104, according to an example embodiment. At first, the UE 104 may expose ML-based assistance capabilities and functionalities to radio access network (RAN) and core network. Successively, the UE 104 may receive a request for activating ML-based functionalities, from the gNB 104, at step 802. Successively, the UE 104 may respond to the request based at least on UE-ML processing resources availability or radio measurement/conditions detection, indicating whether the requested ML-based functionalities may be used or not, at step 804. It should be noted that ML-based assistance capabilities and functionalities of the UE 104 and corresponding inference reporting may be activated by a network device 102 i.e. serving gNB 102. Successively, the gNB 102 may transfer the trained ML model to the UE 104 and may configure the beamFailureThresholdProb in the UE 104, at step 806. Successively, the trained ML model may be stored in the UE 104.

Successively, the UE 104 may request for UE location from the gNB 102 when the BFI_counter>0 and may perform inference, at step 808. Successively, the UE 104 may request for the UE location from the gNB 102 when the BFI_counter>0, at step 810. Successively, the UE 104 may receive UE current location (X, Y) at the time instance, at step 812. Successively, the UE 104 may perform the ML model inference based at least on the UE current location (X, Y) and the BFI_counter. Successively, the UE 104 may check whether a condition is met. The condition may be whether the beamFailureProb is higher than a beam failure threshold probability (beamFailureThresholdProb) or the BFI_counter is greater than or equal to beam failure instance max count (beamFailureInstanceMaxCount. The condition is defined as:
IF BFI_COUNTER>=beamFailureInstanceMaxCount OR
beamFailureProb>=beamFailureThresholdProb Thereafter, the UE 104 may initiate a beam failure recovery if the condition is met, at step 814.

Figure 9:
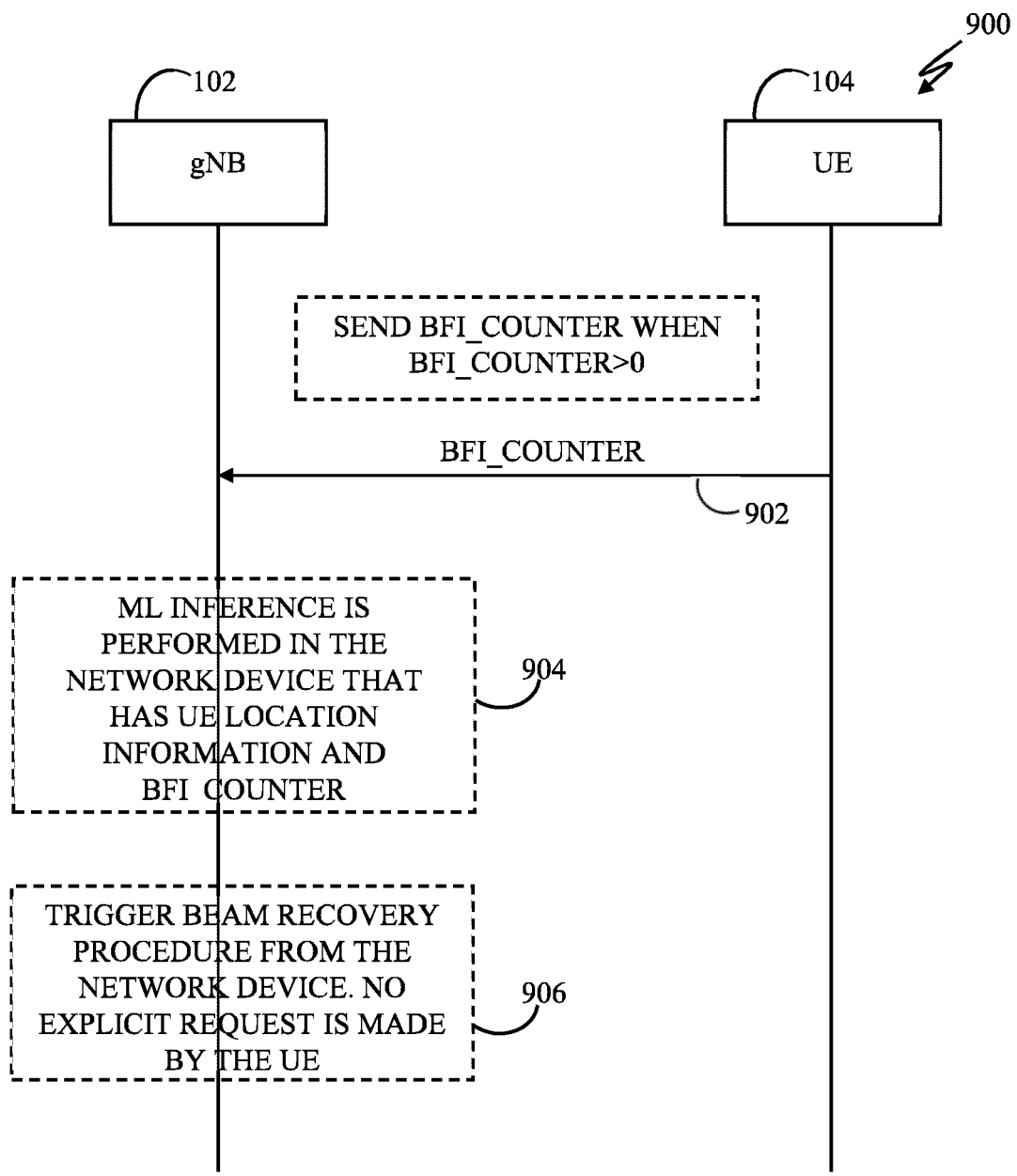
FIG. 9 illustrates a signaling diagram showing a method for beam failure management, where an ML model inference is performed at a network device, according to an example embodiment of the subject matter described herein.

FIG. 9 illustrates a signaling diagram 900 showing a method for beam failure management, where an ML model inference is performed at a network device i.e. gNB 102, according to an example embodiment. At first, the gNB 102 may receive the BFI_counter from the UE 104, at step 902. It should be noted that the UE 104 may send the information related to the BFI_counter to the gNB 102 every time the BFI_counter is incremented. Successively, the gNB 102 may perform the ML model inference based at least on the UE location information and the BFI_counter, at step 904. Thereafter, the gNB 102 may trigger beam recovery procedure, at step 906. It should be noted that no explicit request may be made by the UE 104. Such implementation of performing the ML model inference at the network device 102 i.e. network side, gNB, provides the advantages such as, but is not limited to, the UE 104 does not need to have ML-based assistance capabilities, gNB 102 does not need to send location information to the UE 104, and the network performs the ML model inference and immediately starts beam recovery if required without waiting for the beam recovery request from the UE 104.

It will be apparent to one skilled in the art that deep learning ML model may be used for training and inference purposes, but such method for beam failure management may not be limited to use of any particular ML model and input features. In an example, reinforcement learning may be used as an efficient ML algorithm. Similarly, other UE input features may be used to better predict the probability of beam failure. Such use of 'soft' continuous information on probability function instead of making a hard decision after beamFailureInstanceMaxCount beam failure instances when probability function can quickly predict that probability of a beam failure does not change much after a few initial beam failure instances.

Figure 10:
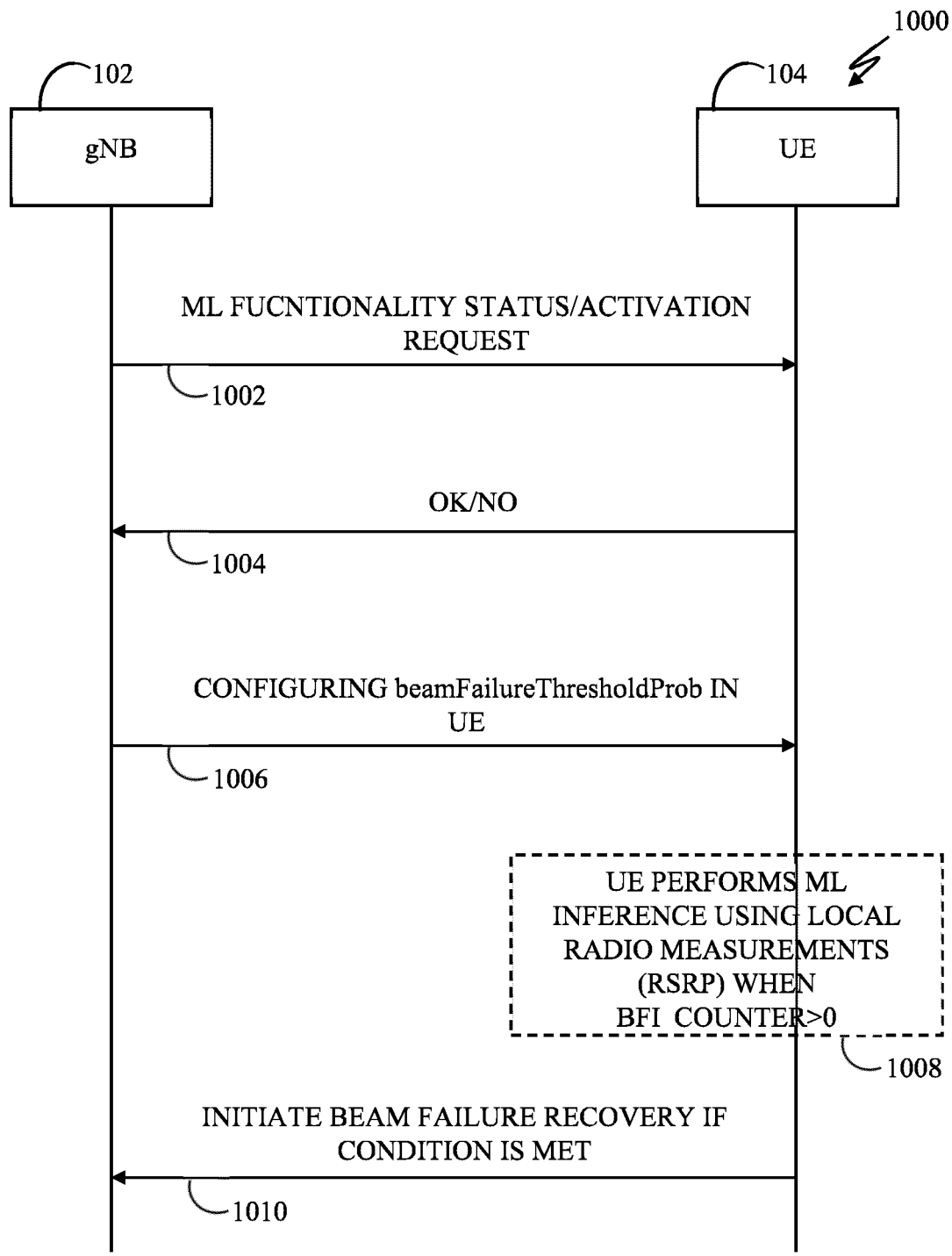
FIG. 10 illustrates a signaling diagram showing a method for beam failure management, where radio measurement-based ML model inference is performed at a user equipment (UE), according to an alternate embodiment of the subject matter described herein.

FIG. 10 illustrates a signaling diagram 1000 showing a method for beam failure management, where radio measurement-based ML model inference is performed at the UE 104, according to an example embodiment. At first, the UE 104 may receive a request for activation of ML-based functionalities from the gNB 102, at step 1002. Successively, the UE 104 may respond to the request based at least on UE-ML processing resources availability or radio measurement/conditions detection, indicating whether the requested ML-based functionalities can be used or not, at step 1004. Successively, the gNB 102 may transfer the trained ML model to the UE 104 and may configure the beamFailureThresholdProb in the UE 104, at step 1006.

Successively, the UE 104 may perform the ML model inference using local radio measurements i.e. UE radio measurements when the BFI_counter>0, at step 1008. The UE radio measurements may be a layer one (L1) reference signal received power (RSRP) i.e. L1-RSRP from best beams of a serving cell or L1-RSRP from serving and neighboring cells). In one example embodiment, a Radio Frequency (RF) fingerprinting based approach, where radio measurements correlated to the UE location for determining the location of the UE 104, may be used. Further, the radio measurements in 5G NR may be performed natively by the UE 104. It should be noted that these radio measurements may provide a tight mapping between the radio measurements and the location of the UE 104. Successively, the UE radio measurements may be used to determine a beam failure probability factor. Successively, the UE 104 may check whether a condition is met. The condition may be whether the beamFailureProb is higher than a beam failure threshold probability (beamFailureThresholdProb) or the BFI_counter is greater than or equal to beam failure instance max count (beamFailureInstanceMaxCount. The condition is defined as:

IF BFI_COUNTER>=beamFailureInstanceMaxCount

OR beamFailureProb>=beamFailureThresholdProb

Thereafter, the UE 104 may initiate a beam failure recovery if the condition is met, at step 814. Such usage of the UE radio measurements eliminates the need of receiving UE location information from the gNB 102. Another advantage of this embodiment is that the gNB 102 is no longer required to transmit location information to the UE 104, to determine the beam failure probability factor.

Figure 11:
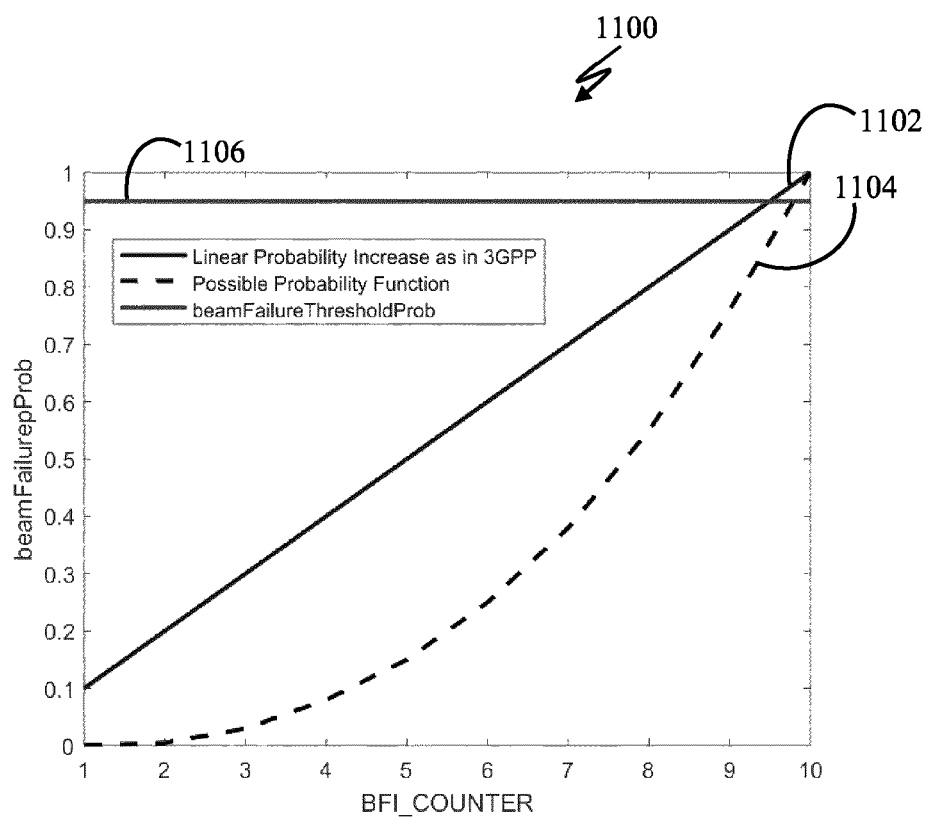
FIG. 11 illustrates a graph showing a scenario where a beam failure probability factor varies as a function of a beam failure instance counter (BFI_counter), according to one example embodiment of the subject matter described herein.

FIG. 11 illustrates a graph 1100 showing a scenario where a beam failure probability factor varies as a function of a beam failure instance counter (BFI_counter), according to an example embodiment. In the graph 1100, a line (shown by 1102) represents Linear Probability Increase as in 3GPP, a line (shown by 1104) represents Possible Probability Function, and a line (shown by 1106) represents the beamFailureThresholdProb. At first, the beamFailureInstanceMaxCount is configured to 10 and the beamFailureThresholdProb is configured to 95%. The graph 1100 further shows a hypothetical beamFailureThresholdProb as a function of the BFI_counter where the UE 104 is moving slowly and inference is performed continuously after each beam failure instance. It should be noted that with each increment in the BFI_counter, the probability for beam failure detection increases linearly by 1/beamFailureInstanceMaxCount. For a specific case, the beamFailureProb may increase monotonically but not rapidly as shown in the graph 1100. In this case, the beamFailureProb is greater than the beamFailureThresholdProb only in the $10^{th}$ consecutive beam failure instance and therefore, the ML-based detection does not improve beam failure declaration. Such a scenario may be an example of a geographical area with less information for training the ML model or the environment is reasonably stable and beam failures are not very common.

Figure 12:
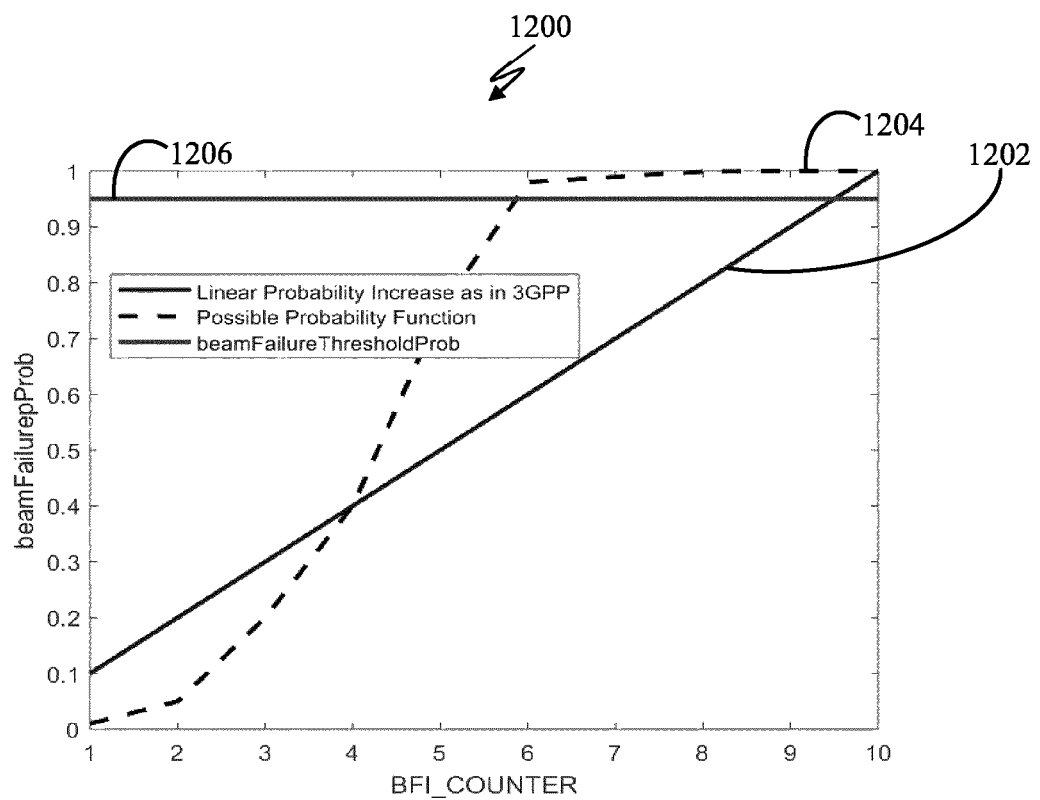
FIG. 12 illustrates a graph showing a scenario in which a beam failure is predicted proactively, according to another example embodiment of the subject matter described herein.

FIG. 12 illustrates a graph 1200 showing a scenario in which beam failure is predicted proactively, according to an example embodiment. In the graph 1200, a line (shown by 1202) represents Linear Probability Increase as in 3GPP, a line (shown by 1204) represents Possible Probability Function, and a line (shown by 1206) represents the beamFailureThresholdProb. At first, after two consecutive failures, as a function of location (X1, Y1) and BFI_counter equal to 4, the ML model predicts the beam failure probability factor is nearly 40%. Further, after a next failure, as a function of new location (X2, Y2) and the BFI_counter equal to 5, the ML model predicts that the beamFailureProb is 75%. It should be noted that after 6th instance, the beamFailureProb goes to 98%. Due to the high value of the beamFailureProb value at the 6th instance, beam failure will happen after 10 consecutive beam failure instances i.e. there is no need to wait for 10 failure instances. Thereafter, beam recovery procedure is initiated 4 instances ahead. Such implementation may be an example of a geographical area with extensive blockages where most of the UEs suffer from beam failure and past experiences of other UEs may be helpful in predicting the beam failure.

Figure 13:
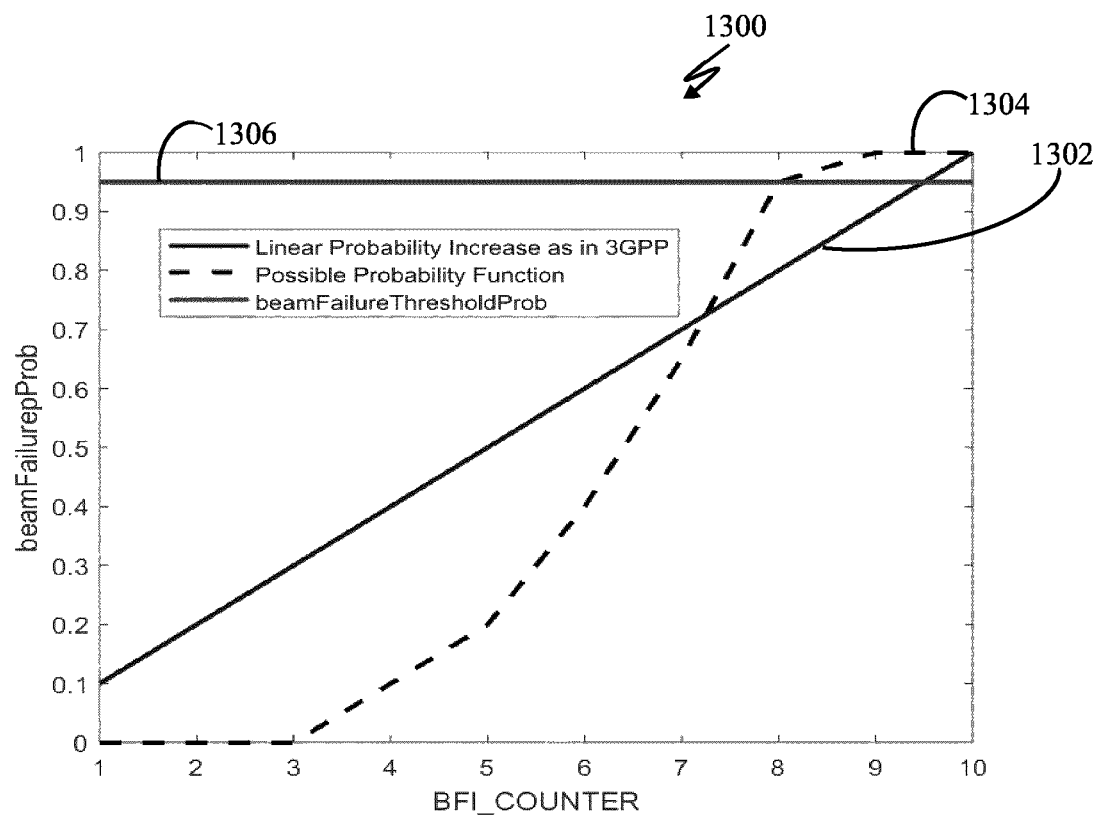
FIG. 13 illustrates a graph showing a scenario where a method for beam failure management, provides immediate gains, according to another example embodiment of the subject matter described herein.

FIG. 13 illustrates a graph 1300 showing a scenario where a method for beam failure management, provides immediate gains, according to an example embodiment. In the graph 1300, a line (shown by 1302) represents Linear Probability Increase as in 3GPP, a line (shown by 1304) represents Possible Probability Function, and a line (shown by 1306) represents the beamFailureThresholdProb. At first, at a location (X1, Y1), the beamFailureProb does not increase much if the BFI_counter is small. Further, the beamFailureProb rises quickly if the BFI_counter is large. This happens if the blockage at a certain location is not very large. In one case, if the BFI_counter is small, then the UE 104 is expected to overcome that blockage pretty quickly and no beam recovery will be required. In another case, when the BFI_counter is large at the location (X1, Y1), then very high probability from the ML model predicts that the UE 104 will not be able to overcome the blockage before the beamFailureInstanceMaxCount. Thereafter, a beam recovery procedure is initiated. It should be noted that the beamFailureInstanceMaxCount and the BFI_counter may not be very large, but it may help to reduce latency in the beam recovery procedure.

It should be noted that the disclosed method may provide proactive beam failure detection in 5G new radio (NR). Instead of waiting for the beamFailureInstanceMaxCount instances, the disclosed method predicts a probability that beam failure will happen after the beamFailureInstanceMaxCount instances. The beamFailureInstanceMaxCount is configured in the UE 104 to a fixed value and the UE beam failure detection. Further, latency gain may be achieved using ML based intelligent prediction as function of the environment and history of other UEs. Further, the disclosed method facilitates timely data delivery for the UE 104 running latency constrained services in the areas with a lot of predictable blockages Further, the proactive beam failure detection helps time sensitive services to start UE beam recovery without waiting for N consecutive beam failure events, and thus helps to maintain connectivity of the UE 104.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

The detailed description section of the application should state that orders of method steps are not critical. Such recitations would later support arguments that the step order in a method claim is not critical or fixed. Features that are described and/or illustrated with respect to one embodiment may be used in the same way or in a similar way in one or more other embodiments and/or in combination with or instead of the features of the other embodiments.

While the above embodiments have been illustrated and described, as noted above, many changes can be made without departing from the spirit and scope of the example embodiments. For example, aspects of the subject matter disclosed herein may be adopted on alternative operating systems. Accordingly, the scope of the example embodiments is not limited by the disclosure of the embodiment. Instead, the example embodiments should be determined entirely by reference to the claims that follow.

What is claimed is:

1. A method for beam failure management for a user equipment, UE, the method comprising:
   determining a beam failure instance counter, BFI_counter, indicative of a number of consecutive beam failure instances occurred at the user equipment, UE at a time instance;
   determining a location of the user equipment, UE at the time instance; and
   determining a beam failure probability factor based at least on the location of the user equipment, UE and the beam failure instance counter, BFI_counter, wherein the beam failure probability factor is indicative of a probability of occurrence of a beam failure at the location of the user equipment, UE, after a plurality of further time instances.

2. The method of claim 1, wherein the determining the location of the user equipment, UE at the time instance comprises receiving the location of the user equipment, UE from a network device or determining the location of the user equipment, UE using radio frequency, RF fingerprinting.

3. The method of claim 1, further comprising comparing the beam failure probability factor with a beam failure threshold probability, beamFailureThresholdProb, and if the beam failure probability factor is higher than the beam failure threshold probability, beamFailureThresholdProb, declaring a beam failure.

4. The method of claim 1, wherein the declaring the beam failure comprises initiating a beam recovery procedure, in particular a random access procedure for a beam failure recovery.

5. The method of claim 2, wherein the beam failure probability factor is determined by a trainable machine learning, ML, model.

6. The method of claim 5, wherein the method is performed at the user equipment, UE (104), and further comprises the steps of:
   receiving, from the network device, a request for activating ML-based functionalities; and
   receiving, from the network device, the beam failure threshold probability, beamFailureThresholdProb and the trainable ML model,
   wherein the step of determining the location of the user equipment, UE, at the time instance comprises, if the beam failure instance counter, BFI_counter>0, requesting and receiving, from the network device, the location of the user equipment, UE, at the time instance.

7. The method of claim 6, wherein the beam failure instance counter, BFI_counter, is determined by counting beam failure instances indicated by the user equipment, UE.

8. The method of claim 5, wherein the method is performed at the network device, and the beam failure instance counter, BFI_counter, is received from the user equipment, UE.

9. A method for training a machine learning, ML, model, at a network device, the method comprising:
   receiving, from at least one user equipment, UE, a plurality of UE locations and a threshold, beamFailureInstanceMaxCount, the threshold being indicative of a maximal number of consecutive beam failure instances;
   determining a training set by labeling pairs comprising a UE location and a beam failure instance counter, BFI_counter, with a beam failure probability factor, wherein the beam failure instance counter, BFI_counter takes values between 1 and the threshold, beamFailureInstanceMaxCount; and
   training the ML model using the labeled training set.

10. The method of claim 9, wherein for each UE location and each beam failure instance counter, BFI_counter, the beam failure probability factor is defined based at least on the beam failure instance counter, BFI_counter, and the UE location, in particular the beam failure probability factor is defined as:

$$beamFailureProb\text{ (location, BFI\_COUNTER} = n) = \frac{\text{No. of times beam failure occurs given that BFI\_COUNTER} = n \text{ at location}(X, Y)}{\text{No. of times BFI\_COUNTER} = n \text{ at location}(X, Y)}$$

wherein beamFailureProb is the beam failure probability factor, BFI_counter is the beam failure instance counter, and location (X, Y) is the UE location.

11. The method of claim 9, wherein the machine learning, ML model is trained to minimize a loss function defining a relationship between the beam failure probability factor and a beam failure probability, the beam failure probability indicating the probability that a beam failure occurs after beamFailureInstanceMaxCount time instances for a given value of the beam failure instance counter, BFI_counter at the UE location.

12. An apparatus, comprising:
at least one processor; and
at least one memory storing instructions that, when executed by the at least one processor, cause the apparatus to perform:
determining a beam failure instance counter, BFI_counter, indicative of a number of consecutive beam failure instances occurred at a user equipment, UE, at a time instance;
determining a location of the user equipment, UE at the time instance; and
determining a beam failure probability factor based at least on the location of the user equipment, UE and the beam failure instance counter, BFI_counter, wherein the beam failure probability factor is indicative of a probability of occurrence of a beam failure at the location of the user equipment, UE, after a plurality of further time instances.

13. The apparatus of claim 12, wherein the determining the location of the user equipment, UE at the time instance comprises receiving the location of the user equipment, UE from a network device or determining the location of the user equipment, UE using radio frequency (RF) fingerprinting.

14. The apparatus of claim 13, wherein the apparatus comprises the user equipment, UE, and is further configured to:

receive, from the network device, a request for activating machine learning, ML-based functionalities; and
receive, from the network device, a beam failure threshold probability and a trainable machine learning, ML model,
wherein the step of determining the location of the user equipment, UE at the time instance comprises, if the beam failure instance counter, BFI_counter>0, requesting and receiving, from the network device, the location of the user equipment, UE at the time instance.

15. The apparatus of claim 13, wherein the apparatus comprises the network device, and is further configured to receive the beam failure instance counter, BFI_counter, from the user equipment, UE.

16. An apparatus for training a machine learning, ML, model, comprising:
at least one processor; and
at least one memory storing instructions that, when executed by the at least one processor, cause the apparatus to perform:
receiving, from at least one user equipment, UE, a plurality of UE locations and a threshold, beamFailureInstanceMaxCount, the threshold being indicative of a maximal number of consecutive beam failure instances;
determining a training set by labeling pairs comprising a UE location and a beam failure instance counter, BFI_counter, with a beam failure probability factor, wherein the beam failure instance counter, BFI_counter, takes values between 1 and the threshold; and
training the ML model using the labeled training set.

17. The apparatus of claim 16, wherein for each UE location and each beam failure instance counter, BFI_counter, the beam failure probability factor is defined based at least on the beam failure instance counter, BFI_counter, and the UE location, in particular the beam failure probability factor is defined as:

$$beamFailureProb \text{ (location, BFI\_COUNTER} = n) = $$

$$\frac{\text{No. of times beam failure occurs given that BFI\_COUNTER} = n \text{ at location}(X, Y)}{\text{No. of times BFI\_COUNTER} = n \text{ at location}(X, Y)}$$

wherein beamFailureProb is the beam failure probability factor, BFI_counter is the beam failure instance counter, and location (X, Y) is the UE location.

18. The apparatus of claim 16, wherein the machine learning, ML model is trained to minimize a loss function defining a relationship between the beam failure probability factor and a beam failure probability, the beam failure probability indicating the probability that a beam failure occurs after beamFailureInstanceMaxCount time instances for a given value of the beam failure instance counter, BFI_counter at the UE location.

19. The method of claim 10, wherein the machine learning, ML model is trained to minimize a loss function defining a relationship between the beam failure probability factor and a beam failure probability, the beam failure probability indicating the probability that a beam failure occurs after beamFailureInstanceMaxCount time instances for a given value of the beam failure instance counter, BFI_counter at the UE location.

* * * * *